US00RE50714E

(19) United States
(12) Reissued Patent
Yoo et al.

(10) Patent Number: US RE50,714 E
(45) Date of Reissued Patent: Dec. 30, 2025

(54) VEHICLE DRIVING CONTROLLER, SYSTEM INCLUDING THE SAME, AND METHOD THEREOF

(71) Applicants: Hyundai Motor Company, Seoul (KR); Kia Motors Corporation, Seoul (KR)

(72) Inventors: Su Jung Yoo, Incheon (KR); Dong Hwi Lee, Seongnam-Si (KR); Jin Su Jeong, Suwon-Si (KR); Jae Yong Jeon, Hwaseong-Si (KR)

(73) Assignees: Hyundai Motor Company, Seoul (KR); Kia Motors Corporation, Seoul (KR)

(21) Appl. No.: 17/965,347

(22) Filed: Oct. 13, 2022

Related U.S. Patent Documents

Reissue of:
(64) Patent No.: 11,351,989
Issued: Jun. 7, 2022
Appl. No.: 16/299,547
Filed: Mar. 12, 2019

U.S. Applications:
(60) Provisional application No. 62/655,831, filed on Apr. 11, 2018.

(30) Foreign Application Priority Data

Dec. 4, 2018 (KR) ..... 10-2018-0154724

(51) Int. Cl.
*B60W 50/14* (2020.01)
*B60W 30/09* (2012.01)
(Continued)

(52) U.S. Cl.
CPC ..... *B60W 50/14* (2013.01); *B60W 30/09* (2013.01); *B60W 30/12* (2013.01); *B60W 30/14* (2013.01);
(Continued)

(58) Field of Classification Search
CPC ..... B60W 50/14; B60W 40/09; B60W 40/10; B60W 50/082; B60W 50/12; B60W 30/16;
(Continued)

(56) References Cited

U.S. PATENT DOCUMENTS 4,361,202 A 11/1982 Minovitch
5,314,037 A 5/1994 Shaw
(Continued)

FOREIGN PATENT DOCUMENTS

CN 101132965 A 2/2008
CN 101175662 A 5/2008
(Continued)

OTHER PUBLICATIONS

Zhu, Yan-Ling & Chen, Jia-Qi, "Research on the Minimum Safe Distance of Vehicle Lane Changing Based on Fish Swarm Grouping Behavior", Software Guide, vol. 17 No. 3, Mar. 2018.
(Continued)

*Primary Examiner* — C. Michelle Tarae
(74) *Attorney, Agent, or Firm* — MORGAN, LEWIS & BOCKIUS LLP

(57) ABSTRACT

A vehicle driving controller, a system including the same, and a method thereof are provided. The vehicle driving controller includes a processor configured to apply a different warning level depending on at least one of a driving situation or a user state during autonomous driving and to provide a notification of a control authority transition demand to a user and a storage configured to store information associated with the driving situation and the user state and information associated with the different warning level.

20 Claims, 11 Drawing Sheets

(51) Int. Cl.

| | |
|---|---|
| ***B60W 30/12*** | (2020.01) |
| ***B60W 30/14*** | (2006.01) |
| ***B60W 30/16*** | (2020.01) |
| ***B60W 40/09*** | (2012.01) |
| ***B60W 40/10*** | (2012.01) |
| ***B60W 50/08*** | (2020.01) |
| ***B60W 50/12*** | (2012.01) |

(52) U.S. Cl.
CPC ..... *B60W 30/16* (2013.01); *B60W 40/09* (2013.01); *B60W 40/10* (2013.01); *B60W 50/082* (2013.01); *B60W 50/12* (2013.01); *B60W 2050/143* (2013.01); *B60W 2540/00* (2013.01); *B60W 2554/00* (2020.02)

(58) Field of Classification Search
CPC ..... B60W 30/14; B60W 30/12; B60W 30/09; B60W 2050/143; B60W 2050/146; B60W 2554/00; B60W 2540/00
See application file for complete search history.

(56) References Cited

U.S. PATENT DOCUMENTS 5,521,579 A 5/1996 Bernhard
5,555,503 A * 9/1996 Kyrtsos ..... G08G 1/202 701/518
5,983,161 A * 11/1999 Lemelson ..... G01S 19/11 340/436
6,055,467 A 4/2000 Mehring et al.
6,353,788 B1 3/2002 Bäker et al.
6,473,678 B1 10/2002 Satoh et al.
6,738,697 B2 * 5/2004 Breed ..... B60C 11/246 701/32.4
6,842,687 B2 1/2005 Winner et al.
7,082,359 B2 * 7/2006 Breed ..... G07C 5/0808 702/182
7,089,099 B2 * 8/2006 Shostak ..... B60C 23/005 701/34.3
7,102,496 B1 * 9/2006 Ernst, Jr. ..... G08G 1/096725 340/436
7,363,140 B2 4/2008 Ewerhart et al.
7,424,357 B2 9/2008 Ozaki et al.
7,797,107 B2 * 9/2010 Shiller ..... G08G 1/166 180/274
7,821,421 B2 10/2010 Tamir et al.
7,893,819 B2 2/2011 Pfeiffer et al.
8,073,595 B2 12/2011 Tabata et al.
8,150,581 B2 4/2012 Iwazaki et al.
8,165,776 B2 4/2012 Sugawara et al.
8,190,330 B2 5/2012 Lee
8,352,173 B2 * 1/2013 Greene ..... G08G 1/166 340/436
8,395,529 B2 * 3/2013 Seder ..... G08G 1/168 382/104
8,457,827 B1 6/2013 Ferguson et al.
8,521,352 B1 8/2013 Ferguson et al.
8,543,310 B2 9/2013 Kashi et al.
8,618,922 B2 * 12/2013 Debouk ..... B60W 50/038 340/576
8,666,599 B2 3/2014 Otuka
8,676,443 B2 3/2014 Han et al.
8,744,742 B2 6/2014 Nishimak et al.
8,798,841 B1 8/2014 Nickolaou et al.
8,874,301 B1 10/2014 Rao et al.
9,014,919 B2 4/2015 Kim
9,079,571 B2 7/2015 Trost
9,134,731 B2 9/2015 Healey et al.
9,159,023 B2 10/2015 Bone et al.
9,177,477 B2 * 11/2015 Mochizuki ..... G08G 1/162
9,187,117 B2 11/2015 Spero et al.
9,315,178 B1 4/2016 Ferguson et al.
9,342,074 B2 5/2016 Dolgov et al.
9,358,984 B2 * 6/2016 Silvlin ..... B60W 50/10
9,428,183 B2 * 8/2016 Foley ..... G05B 9/02
9,522,700 B2 12/2016 Yamaoka
9,527,441 B2 12/2016 Matsumura
9,529,361 B2 12/2016 You et al.
9,533,685 B2 1/2017 Ask
9,550,496 B2 1/2017 Suzuki et al.
9,566,981 B2 * 2/2017 Rebhan ..... B60W 30/0953
9,582,004 B2 2/2017 Rothoff et al.
9,604,641 B2 * 3/2017 Al-Stouhi ..... B60W 10/04
9,616,924 B2 4/2017 Spero et al.
9,616,925 B2 4/2017 Spero et al.
9,630,618 B2 4/2017 Eigel
9,643,650 B2 5/2017 Sim
9,651,947 B2 5/2017 Kim
9,682,689 B2 * 6/2017 Parker ..... B60T 8/171
9,682,708 B2 6/2017 Maruyama
9,682,725 B2 6/2017 Yamaoka
9,718,473 B2 8/2017 Suzuki
9,722,902 B2 8/2017 Oooka et al.
9,751,530 B2 9/2017 Cho
9,751,534 B2 * 9/2017 Fung ..... G06V 10/764
9,779,626 B2 10/2017 Seo
9,802,614 B1 10/2017 Yoon
9,809,164 B2 11/2017 Matsuno et al.
9,855,956 B2 1/2018 Omi
9,874,871 B1 1/2018 Zhu et al.
9,878,723 B2 1/2018 Kim
9,884,645 B2 2/2018 Fujii et al.
9,889,884 B2 2/2018 Matsuno et al.
9,902,395 B2 2/2018 Miura et al.
9,933,783 B2 4/2018 Kindo et al.
9,950,740 B2 4/2018 Sato et al.
9,969,406 B2 5/2018 Shirakata et al.
9,994,219 B2 6/2018 Nilsson et al.
10,026,239 B2 7/2018 Kim et al.
10,081,358 B2 9/2018 Shimizu et al.
10,099,705 B2 10/2018 Letwin et al.
10,112,621 B2 10/2018 Hwang
10,118,641 B2 11/2018 Fujita
10,131,355 B2 11/2018 Takaso et al.
10,131,356 B2 11/2018 Takae
10,152,883 B2 12/2018 Fujimaki
10,155,515 B2 12/2018 Nishiguchi et al.
10,166,997 B2 1/2019 Oba
10,179,605 B2 1/2019 Tamura
10,183,668 B2 1/2019 Takae
10,202,123 B2 2/2019 Aoki
10,228,698 B2 3/2019 Mimura
10,235,882 B1 * 3/2019 Aoude ..... G08G 1/164
10,241,510 B2 3/2019 Jung et al.
10,259,458 B2 4/2019 Yoo et al.
10,259,459 B2 4/2019 Takae
10,286,907 B2 5/2019 Nishiguchi et al.
10,300,916 B2 5/2019 Goto et al.
10,324,463 B1 6/2019 Konrardy et al.
10,328,941 B2 6/2019 Fujii et al.
10,331,127 B2 6/2019 Oba
10,336,345 B2 7/2019 Hatano
10,345,814 B2 7/2019 Keller et al.
10,377,303 B2 * 8/2019 McNew ..... B60W 50/14
10,377,366 B2 8/2019 Otake
10,386,837 B2 8/2019 Min
10,392,010 B2 8/2019 Miura et al.
10,427,694 B2 10/2019 Oba
10,446,033 B2 * 10/2019 Mills ..... G01S 13/931
10,449,856 B2 10/2019 Kojima
10,449,971 B2 10/2019 Arakawa et al.
10,451,730 B2 10/2019 Talamonti et al.
10,464,604 B2 11/2019 Hashimoto et al.
10,486,712 B2 11/2019 Niino et al.
10,493,997 B2 12/2019 Kim
10,501,084 B2 12/2019 Sugawara et al.
10,509,406 B2 12/2019 Choi et al.
10,514,698 B2 12/2019 Nakajima
10,558,213 B2 2/2020 Sato et al.
10,562,543 B2 2/2020 Oba
10,583,843 B2 3/2020 Tamagaki et al.
10,611,383 B2 4/2020 Bae
10,618,523 B1 4/2020 Fields et al.

(56) References Cited

U.S. PATENT DOCUMENTS 10,627,813 B2 4/2020 Tsuji et al.
10,663,971 B2 5/2020 Sugawara et al.
10,676,084 B2 6/2020 Fujii
10,689,005 B2 6/2020 Oishi et al.
10,710,632 B2 7/2020 Sato et al.
10,713,952 B2 7/2020 Ogawa et al.
10,723,367 B2 7/2020 Tamagaki et al.
10,747,220 B2 8/2020 Uchida et al.
10,752,250 B2 8/2020 Feron et al.
10,759,425 B2 9/2020 Urano et al.
10,782,683 B2 9/2020 Mukai et al.
10,814,876 B2 10/2020 Liu et al.
10,814,913 B2 10/2020 Fujii
10,906,555 B2 2/2021 Yamamoto
10,935,974 B1 3/2021 Fields et al.
11,014,562 B2 5/2021 Fukuda et al.
11,040,726 B2 * 6/2021 Tao ..... G08G 1/166
11,054,824 B2 7/2021 Oba
11,186,296 B2 11/2021 Oba
11,351,989 B2 * 6/2022 Yoo ..... G05D 1/0061
11,492,017 B2 11/2022 Tamagaki et al.
11,673,569 B2 6/2023 Yamamoto
11,718,329 B2 8/2023 Oba
12,077,192 B2 9/2024 Oba
2003/0163239 A1 8/2003 Winner et al.
2004/0193374 A1 9/2004 Hac et al.
2005/0137782 A1 6/2005 Shinada
2005/0228588 A1 10/2005 Braeuchle et al.
2005/0256630 A1 11/2005 Nishira et al.
2006/0009910 A1 1/2006 Ewerhart et al.
2007/0043505 A1 2/2007 Leicht
2007/0255474 A1 11/2007 Hayakawa et al.
2008/0172153 A1 7/2008 Ozaki et al.
2008/0204212 A1 8/2008 Jordan et al.
2009/0005933 A1 1/2009 Tabata et al.
2009/0048738 A1 2/2009 Iwazaki et al.
2009/0088925 A1 4/2009 Sugawara et al.
2009/0132125 A1 5/2009 Yonezawa et al.
2009/0171533 A1 7/2009 Kataoka
2009/0194350 A1 8/2009 Rattapon et al.
2009/0212930 A1 8/2009 Pfeiffer et al.
2009/0222170 A1 9/2009 Scherl et al.
2009/0299573 A1 12/2009 Thrun et al.
2009/0319113 A1 12/2009 Lee
2010/0010733 A1 1/2010 Krumm
2010/0042282 A1 2/2010 Taguchi et al.
2010/0106356 A1 4/2010 Trepagnier et al.
2010/0228420 A1 9/2010 Lee
2010/0289632 A1 11/2010 Seder et al.
2011/0022317 A1 1/2011 Okita
2011/0118936 A1 5/2011 Hong
2011/0137487 A1 6/2011 Nishimak et al.
2011/0169625 A1 7/2011 James et al.
2011/0196592 A1 8/2011 Kashi et al.
2011/0241862 A1 10/2011 Debouk et al.
2011/0251758 A1 10/2011 Kataoka
2011/0293145 A1 12/2011 Nogami et al.
2012/0166032 A1 6/2012 Lee et al.
2012/0188374 A1 7/2012 Taner
2012/0283907 A1 11/2012 Lee et al.
2012/0296522 A1 11/2012 Otuka
2013/0018549 A1 1/2013 Kobana et al.
2013/0063595 A1 3/2013 Niem
2013/0066525 A1 3/2013 Tomik et al.
2013/0085976 A1 4/2013 Bone et al.
2013/0166150 A1 6/2013 Han et al.
2013/0184926 A1 7/2013 Spero et al.
2013/0226406 A1 8/2013 Ueda et al.
2013/0253793 A1 9/2013 Lee et al.
2014/0074356 A1 3/2014 Bone
2014/0136015 A1 5/2014 Hayakawa et al.
2014/0218508 A1 8/2014 Kim
2014/0303827 A1 10/2014 Dolgov et al.
2014/0309855 A1 10/2014 Tran
2014/0309889 A1 10/2014 Kim
2014/0336896 A1 11/2014 Udaka et al.
2015/0006012 A1 1/2015 Kammel et al.
2015/0006013 A1 1/2015 Wimmer et al.
2015/0019063 A1 1/2015 Lu et al.
2015/0057869 A1 2/2015 Healey et al.
2015/0070160 A1 * 3/2015 Davidsson ..... B60W 50/14 340/457
2015/0094899 A1 4/2015 Hackenberg et al.
2015/0134176 A1 5/2015 Ham
2015/0142244 A1 5/2015 You et al.
2015/0148985 A1 5/2015 Jo
2015/0166062 A1 6/2015 Johnson et al.
2015/0191176 A1 7/2015 Kobana et al.
2015/0204687 A1 7/2015 Yoon et al.
2015/0235140 A1 8/2015 Rothermel
2015/0253778 A1 9/2015 Rothoff et al.
2015/0321699 A1 11/2015 Rebhan et al.
2015/0345961 A1 12/2015 Oooka et al.
2015/0348418 A1 12/2015 Pfeiffer
2015/0353082 A1 12/2015 Lee et al.
2015/0355641 A1 12/2015 Choi et al.
2015/0360684 A1 12/2015 Matsuno et al.
2015/0360721 A1 12/2015 Matsuno et al.
2016/0001781 A1 * 1/2016 Fung ..... B60K 28/02 701/36
2016/0039458 A1 2/2016 Spero et al.
2016/0039459 A1 2/2016 Spero et al.
2016/0068103 A1 3/2016 McNew et al.
2016/0090087 A1 3/2016 Lee
2016/0091896 A1 3/2016 Maruyama
2016/0091897 A1 3/2016 Nilsson et al.
2016/0107682 A1 4/2016 Tan et al.
2016/0107687 A1 4/2016 Yamaoka
2016/0121886 A1 5/2016 Eigel
2016/0121893 A1 5/2016 Ask
2016/0185388 A1 6/2016 Sim
2016/0187879 A1 6/2016 Mere et al.
2016/0209840 A1 7/2016 Kim
2016/0209841 A1 7/2016 Yamaoka
2016/0225261 A1 8/2016 Matsumoto
2016/0250968 A1 9/2016 Shirakata et al.
2016/0272204 A1 9/2016 Takahashi et al.
2016/0288707 A1 10/2016 Matsumura
2016/0297431 A1 10/2016 Eigel et al.
2016/0297447 A1 10/2016 Suzuki
2016/0304089 A1 10/2016 Miura et al.
2016/0304097 A1 10/2016 Taira et al.
2016/0311464 A1 10/2016 Yamaoka
2016/0313738 A1 10/2016 Kindo et al.
2016/0318518 A1 11/2016 Suzuki et al.
2016/0325750 A1 11/2016 Kanda
2016/0339913 A1 11/2016 Yamashita et al.
2016/0349066 A1 12/2016 Chung et al.
2016/0355190 A1 12/2016 Omi
2016/0368492 A1 * 12/2016 Al-Stouhi ..... G08G 1/162
2017/0003683 A1 1/2017 Sato et al.
2017/0032677 A1 2/2017 Seo
2017/0036673 A1 2/2017 Lee
2017/0057503 A1 3/2017 Cho
2017/0057520 A1 3/2017 Letwin et al.
2017/0061799 A1 3/2017 Fujii et al.
2017/0072952 A1 3/2017 Si
2017/0092125 A1 3/2017 Fujimaki
2017/0108865 A1 4/2017 Rohde et al.
2017/0124882 A1 5/2017 Wang
2017/0148327 A1 5/2017 Sim
2017/0151982 A1 6/2017 Fujii et al.
2017/0166114 A1 6/2017 Kim et al.
2017/0169627 A1 6/2017 Kim et al.
2017/0171375 A1 6/2017 Kamata
2017/0183007 A1 6/2017 Oh et al.
2017/0197634 A1 7/2017 Sato
2017/0197637 A1 7/2017 Yamada et al.
2017/0203763 A1 7/2017 Yamada et al.
2017/0203764 A1 7/2017 Fujiki et al.
2017/0225685 A1 8/2017 Aoki
2017/0225686 A1 8/2017 Takaso et al.
2017/0235305 A1 8/2017 Jung et al.
2017/0240172 A1 8/2017 Nishiguchi et al.

(56) References Cited

U.S. PATENT DOCUMENTS

2017/0240177 A1 8/2017 Fujii et al.
2017/0240186 A1 8/2017 Hatano
2017/0242435 A1 8/2017 Nilsson et al.
2017/0243491 A1 8/2017 Fujii et al.
2017/0247041 A1 8/2017 Kim
2017/0274931 A1 9/2017 Yang et al.
2017/0291603 A1 10/2017 Nakamura
2017/0297566 A1 10/2017 Matsumura et al.
2017/0297569 A1 10/2017 Nilsson et al.
2017/0305418 A1 10/2017 Bae
2017/0305440 A1 10/2017 Oba
2017/0308094 A1 10/2017 Abe et al.
2017/0313313 A1 11/2017 Asakura
2017/0315556 A1 11/2017 Mimura ..... G05D 1/0061
2017/0320500 A1 11/2017 Yoo et al.
2017/0320521 A1 11/2017 Fujita
2017/0334460 A1 11/2017 Arakawa et al.
2017/0341652 A1 11/2017 Sugawara et al.
2017/0341653 A1 11/2017 Kubota et al.
2017/0349172 A1 12/2017 Kubota et al.
2017/0349173 A1 12/2017 Nishiguchi
2017/0349212 A1 12/2017 Oshida et al.
2017/0364070 A1 12/2017 Oba
2017/0368936 A1 12/2017 Kojima
2017/0369075 A1 12/2017 Hwang
2018/0009437 A1 1/2018 Ooba
2018/0029604 A1 2/2018 Niino et al.
2018/0033309 A1 2/2018 Norwood
2018/0037216 A1 2/2018 Otake
2018/0037227 A1 2/2018 D'sa et al.
2018/0037260 A1 2/2018 Otake et al.
2018/0043897 A1 2/2018 Hashimoto et al.
2018/0043906 A1 2/2018 Huang
2018/0043935 A1 2/2018 Hashimoto et al.
2018/0046185 A1 2/2018 Sato et al.
2018/0046192 A1 2/2018 Keller et al.
2018/0050659 A1 2/2018 Coburn
2018/0057000 A1 3/2018 Lee et al.
2018/0057002 A1 3/2018 Lee et al.
2018/0058879 A1 3/2018 Tayama
2018/0065664 A1 3/2018 Watanabe et al.
2018/0074492 A1 3/2018 Yamamoto et al.
2018/0074497 A1 3/2018 Tsuji et al.
2018/0081358 A1 3/2018 Laur et al.
2018/0086338 A1 3/2018 Yamada et al.
2018/0086373 A1 3/2018 Tamura
2018/0088572 A1 3/2018 Uchida et al.
2018/0088574 A1 3/2018 Latotzki et al.
2018/0091085 A1 3/2018 Tamagaki et al.
2018/0099662 A1 4/2018 Miura et al.
2018/0111628 A1 4/2018 Tamagaki et al.
2018/0148071 A1 5/2018 Kim
2018/0154939 A1 6/2018 Aoki
2018/0157038 A1 6/2018 Kabe
2018/0162416 A1 6/2018 Honda et al.
2018/0170370 A1 6/2018 Kataoka
2018/0173227 A1 6/2018 Mukai et al.
2018/0178713 A1 6/2018 Fujii
2018/0178714 A1 6/2018 Fujii
2018/0178715 A1 6/2018 Fujii
2018/0178716 A1 6/2018 Fujii
2018/0178801 A1 6/2018 Hashimoto et al.
2018/0178802 A1 6/2018 Miyata
2018/0181121 A1 6/2018 Min
2018/0186372 A1 7/2018 Shimizu et al.
2018/0186376 A1 7/2018 Lee et al.
2018/0188735 A1 7/2018 Sugawara et al.
2018/0194280 A1 7/2018 Shibata et al.
2018/0197414 A1 7/2018 Oooka
2018/0201314 A1 7/2018 Sato et al.
2018/0208198 A1 7/2018 Urano et al.
2018/0209801 A1 7/2018 Stentz et al.
2018/0215387 A1 8/2018 Takae
2018/0215388 A1 8/2018 Takae
2018/0215389 A1 8/2018 Takae
2018/0217604 A1 8/2018 Nakajima
2018/0222422 A1 8/2018 Takae
2018/0222423 A1 8/2018 Takae et al.
2018/0237018 A1 8/2018 Goto et al.
2018/0237030 A1 8/2018 Jones et al.
2018/0239352 A1 8/2018 Wang et al.
2018/0239358 A1 8/2018 Choi et al.
2018/0251155 A1 9/2018 Chan et al.
2018/0257669 A1 9/2018 Makke
2018/0281788 A1 10/2018 Uchida
2018/0290666 A1 10/2018 Ichikawa et al.
2018/0292820 A1 10/2018 Markberger
2018/0297638 A1 10/2018 Fujii
2018/0297639 A1 10/2018 Fujii
2018/0297640 A1 10/2018 Fujii
2018/0339708 A1 11/2018 Geller
2018/0345959 A1 12/2018 Fujii
2018/0345960 A1 12/2018 Fujii
2018/0345964 A1 12/2018 Fujii et al.
2018/0346027 A1 12/2018 Fujii
2018/0348758 A1 12/2018 Nakamura et al.
2018/0350242 A1 12/2018 Fujii
2018/0354519 A1 12/2018 Miyata
2018/0362013 A1 12/2018 Ungermann
2018/0370542 A1 12/2018 Braunagel et al.
2018/0370544 A1 12/2018 Kitagawa
2018/0373250 A1 12/2018 Nakamura et al.
2019/0005823 A1 1/2019 Fujiki et al.
2019/0026918 A1 1/2019 Gomezcaballero et al.
2019/0027040 A1 1/2019 Ogawa et al.
2019/0039627 A1 2/2019 Yamamoto
2019/0047469 A1 2/2019 Nishiguchi et al.
2019/0047561 A1 2/2019 Nishiguchi et al.
2019/0049958 A1 2/2019 Liu et al.
2019/0061766 A1 2/2019 Nishiguchi
2019/0071099 A1 3/2019 Nishiguchi
2019/0077411 A1 3/2019 Oishi et al.
2019/0100211 A1 4/2019 Liu et al.
2019/0106108 A1 4/2019 Wienecke et al.
2019/0106122 A1 4/2019 Oba
2019/0126923 A1 5/2019 Taie et al.
2019/0126927 A1 5/2019 Uejima
2019/0135290 A1 5/2019 Marden et al.
2019/0155279 A1 5/2019 Tayama
2019/0161117 A1 5/2019 Suzuki
2019/0168754 A1 6/2019 Makled et al.
2019/0185005 A1 6/2019 Fukuda
2019/0196481 A1 6/2019 Tay et al.
2019/0197497 A1 6/2019 Abari et al.
2019/0212443 A1 7/2019 Nomura et al.
2019/0225223 A1 7/2019 Feron et al.
2019/0235504 A1 8/2019 Carter et al.
2019/0241158 A1 8/2019 Ghannam et al.
2019/0241198 A1 8/2019 Mori et al.
2019/0250620 A1 8/2019 Huang et al.
2019/0256064 A1 8/2019 Hecker et al.
2019/0263411 A1 8/2019 Saikyo et al.
2019/0265712 A1 8/2019 Satzoda et al.
2019/0271981 A1 9/2019 Oba
2019/0279507 A1 9/2019 Oshisaka et al.
2019/0283757 A1 9/2019 Honda et al.
2019/0285726 A1 9/2019 Muto
2019/0291642 A1 9/2019 Chae et al.
2019/0291728 A1 9/2019 Shalev-Shwartz et al.
2019/0302763 A1 10/2019 Kondo et al.
2019/0302768 A1 10/2019 Zhang et al.
2019/0315362 A1 10/2019 Um et al.
2019/0317494 A1 10/2019 Lee et al.
2019/0325758 A1 10/2019 Yoshii et al.
2019/0359202 A1 11/2019 Zhu et al.
2019/0367049 A1 12/2019 Oba
2019/0391580 A1 12/2019 Di Cairano et al.
2020/0001714 A1 1/2020 Kojima
2020/0049513 A1 2/2020 Ma
2020/0066160 A1 2/2020 Mishina et al.
2020/0073396 A1 3/2020 Shimizu
2020/0148228 A1 5/2020 Oba
2020/0172123 A1 6/2020 Kubota et al.
2020/0180638 A1 6/2020 Kanoh

(56) References Cited

U.S. PATENT DOCUMENTS

| | | | |
|---|---|---|---|
| 2020/0189618 | A1 | 6/2020 | Ochida |
| 2020/0269747 | A1 | 8/2020 | Kusayanagi et al. |
| 2020/0269880 | A1 | 8/2020 | Tokita |
| 2020/0301431 | A1 | 9/2020 | Matsubara et al. |
| 2020/0307634 | A1 | 10/2020 | Yashiro |
| 2020/0312155 | A1 | 10/2020 | Kelkar et al. |
| 2020/0339128 | A1 | 10/2020 | Kanoh |
| 2020/0391593 | A1 | 12/2020 | Lee et al. |
| 2021/0114613 | A1 | 4/2021 | Yamamoto |
| 2021/0188258 | A1 | 6/2021 | Goto et al. |
| 2021/0188262 | A1 | 6/2021 | Goto et al. |
| 2021/0188356 | A1 | 6/2021 | Goto et al. |
| 2021/0286357 | A1 | 9/2021 | Oba |
| 2022/0055645 | A1 | 2/2022 | Oba |
| 2023/0331261 | A1 | 10/2023 | Oba |
| 2024/0391505 | A1 | 11/2024 | Oba |

FOREIGN PATENT DOCUMENTS

| | | | |
|---|---|---|---|
| CN | 101321655 | A | 12/2008 |
| CN | 101837781 | A | 9/2010 |
| CN | 102112353 | A | 6/2011 |
| CN | 102126497 | A | 7/2011 |
| CN | 103171554 | A | 6/2013 |
| CN | 103204163 | A | 7/2013 |
| CN | 104097637 | A | 10/2014 |
| CN | 104276180 | A | 1/2015 |
| CN | 104627061 | A | 5/2015 |
| CN | 104678832 | A | 6/2015 |
| CN | 104812650 | A | 7/2015 |
| CN | 104890595 | A | 9/2015 |
| CN | 105026247 | A | 11/2015 |
| CN | 105172792 | A | 12/2015 |
| CN | 105263736 | A | 1/2016 |
| CN | 105460014 | A | 4/2016 |
| CN | 105523037 | A | 4/2016 |
| CN | 105564432 | A | 5/2016 |
| CN | 105636849 | A | 6/2016 |
| CN | 105730443 | A | 7/2016 |
| CN | 105752081 | A | 7/2016 |
| CN | 105966396 | A | 9/2016 |
| CN | 105980228 | A | 9/2016 |
| CN | 106080601 | A | 11/2016 |
| CN | 106114217 | A | 11/2016 |
| CN | 106114515 | A | 11/2016 |
| CN | 106114520 | A | 11/2016 |
| CN | 106218638 | A | 12/2016 |
| CN | 106314419 | A | 1/2017 |
| CN | 106394403 | A | 2/2017 |
| CN | 106414204 | A | 2/2017 |
| CN | 106476803 | A | 3/2017 |
| CN | 106515732 | A | 3/2017 |
| CN | 106796759 | A | 5/2017 |
| CN | 106809215 | A | 6/2017 |
| CN | 106991846 | A | 7/2017 |
| CN | 107000760 | A | 8/2017 |
| CN | 107031631 | A | 8/2017 |
| CN | 107077791 | A | 8/2017 |
| CN | 107089228 | | 8/2017 |
| CN | 107207013 | A | 9/2017 |
| CN | 107209999 | A | 9/2017 |
| CN | 107339997 | A | 11/2017 |
| CN | 107408343 | A | 11/2017 |
| CN | 107408349 | A | 11/2017 |
| CN | 107463122 | A | 12/2017 |
| CN | 107539126 | A | 1/2018 |
| CN | 107660189 | A | 2/2018 |
| CN | 107685729 | A | 2/2018 |
| CN | 107709126 | A | 2/2018 |
| CN | 107719363 | A | 2/2018 |
| CN | 107792072 | A | 3/2018 |
| CN | 107792073 | A | 3/2018 |
| CN | 107817791 | A | 3/2018 |
| CN | 107867291 | A | 4/2018 |
| CN | 107886770 | A | 4/2018 |
| CN | 108202743 | A | 6/2018 |
| CN | 108216227 | A | 6/2018 |
| CN | 108473138 | A | 8/2018 |
| CN | 109398346 | A | 3/2019 |
| DE | 198 21 122 | A1 | 6/1999 |
| DE | 101 14 187 | A1 | 9/2002 |
| DE | 10343199 | A1 | 4/2005 |
| DE | 102004005815 | B3 | 6/2005 |
| DE | 10 2004 048 468 | A1 | 4/2006 |
| DE | 10 2007 005 245 | A1 | 11/2007 |
| DE | 10 2010 004 625 | A1 | 7/2011 |
| DE | 10 2011 016 770 | A1 | 11/2011 |
| DE | 10 2011 016 771 | A1 | 10/2012 |
| DE | 10 2012 001405 | A1 | 11/2012 |
| DE | 10 2011 109618 | A1 | 2/2013 |
| DE | 10 2012 008090 | A1 | 10/2013 |
| DE | 102012007389 | A1 | 10/2013 |
| DE | 10 2014 200896 | A | 7/2015 |
| DE | 102015209943 | A1 | 12/2015 |
| DE | 102015115360 | A1 | 3/2016 |
| DE | 102015220007 | A1 | 4/2016 |
| DE | 10 2014 225 680 | A1 | 6/2016 |
| DE | 10 2015 205131 | A1 | 9/2016 |
| DE | 102016202946 | A1 | 9/2016 |
| DE | 102015206969 | A1 | 10/2016 |
| DE | 102015209476 | A1 | 11/2016 |
| DE | 102015219231 | A1 | 4/2017 |
| DE | 10 2016 007187 | A1 | 6/2017 |
| DE | 102015224244 | A1 | 6/2017 |
| DE | 102016200210 | A1 | 7/2017 |
| DE | 10 2016 215565 | A1 | 2/2018 |
| DE | 102017114495 | A1 | 2/2018 |
| DE | 10 2016 216134 | A1 | 3/2018 |
| EA | 201500786 | A1 | 1/2017 |
| EP | 1074904 | A1 | 2/2001 |
| EP | 1 495 932 | A1 | 1/2005 |
| EP | 1607264 | A1 | 12/2005 |
| EP | 2 042 399 | A2 | 4/2009 |
| EP | 2116984 | A1 | 11/2009 |
| EP | 2314490 | A | 4/2011 |
| EP | 2657921 | A1 | 10/2013 |
| EP | 2978648 | A1 | 2/2016 |
| EP | 3075618 | A2 | 10/2016 |
| EP | 3232286 | A1 | 10/2017 |
| EP | 3239960 | A1 | 11/2017 |
| EP | 3 264 211 | A1 | 1/2018 |
| EP | 3284646 | A1 | 2/2018 |
| EP | 3075618 | A3 | 5/2018 |
| EP | 19167267.4 | | 8/2021 |
| FR | 3041917 | A1 | 4/2017 |
| JP | H07-160994 | A | 6/1995 |
| JP | H11-28948 | A | 2/1999 |
| JP | 2000-020898 | A | 1/2000 |
| JP | 2000-198458 | A | 7/2000 |
| JP | 2003-025868 | A | 1/2003 |
| JP | 2005-037329 | A | 2/2005 |
| JP | 2006-029867 | A | 2/2006 |
| JP | 2007-62711 | A | 3/2007 |
| JP | 2008-003662 | A | 1/2008 |
| JP | 2008-515701 | A | 5/2008 |
| JP | 2009-078735 | A | 4/2009 |
| JP | 2009-184554 | A | 8/2009 |
| JP | 2010-069921 | A | 4/2010 |
| JP | 2010-115959 | A | 5/2010 |
| JP | 2010-125923 | A | 6/2010 |
| JP | 2010-241363 | A | 10/2010 |
| JP | 2012-051441 | A | 3/2012 |
| JP | 2012-226392 | A | 11/2012 |
| JP | 2015-066962 | A | 4/2015 |
| JP | 2015-066963 | A | 4/2015 |
| JP | 2015-075889 | A | 4/2015 |
| JP | 2015-138330 | A | 7/2015 |
| JP | 2015-228089 | A | 12/2015 |
| JP | 2016-000602 | A | 1/2016 |
| JP | 2016-002892 | A | 1/2016 |
| JP | 2016-011031 | A | 1/2016 |
| JP | 2016-030513 | A | 3/2016 |
| JP | 2016-040139 | A | 3/2016 |
| JP | 2016-068774 | A | 5/2016 |

(56) References Cited

FOREIGN PATENT DOCUMENTS

| | | | |
|---|---|---|---|
| JP | 2016-071513 | A | 5/2016 |
| JP | 2016-084093 | A | 5/2016 |
| JP | 2016-115356 | A | 6/2016 |
| JP | 2016-137819 | A | 8/2016 |
| JP | 2016-149109 | A | 8/2016 |
| JP | 2016-149122 | A | 8/2016 |
| JP | 2016-151815 | A | 8/2016 |
| JP | 2016-196285 | A | 11/2016 |
| JP | 2016-197394 | A | 11/2016 |
| JP | 2016-203691 | A | 12/2016 |
| JP | 2016-203882 | A | 12/2016 |
| JP | 2016-207060 | A | 12/2016 |
| JP | 2017-062696 | A | 3/2017 |
| JP | 2017-084115 | A | 5/2017 |
| JP | 2017-100681 | A | 6/2017 |
| JP | 6154411 | B2 | 6/2017 |
| JP | 2017-128180 | A | 7/2017 |
| JP | 2017-133893 | A | 8/2017 |
| JP | 2017-134664 | A | 8/2017 |
| JP | 2017-138899 | A | 8/2017 |
| JP | 2017-140997 | A | 8/2017 |
| JP | 2017-146819 | A | 8/2017 |
| JP | 2017-149179 | | 8/2017 |
| JP | 2017-165322 | A | 9/2017 |
| JP | 2017-200786 | A | 11/2017 |
| JP | 2017-210034 | A | 11/2017 |
| JP | 2017-217969 | A | 12/2017 |
| JP | 2018-047737 | A | 3/2018 |
| JP | 2018-517605 | A | 7/2018 |
| JP | 2018-118609 | A | 8/2018 |
| JP | 2019-043169 | A | 3/2019 |
| KR | 10-1998-0047319 | A | 9/1998 |
| KR | 10-0361282 | B1 | 11/2002 |
| KR | 10-0578573 | B2 | 5/2006 |
| KR | 10-0600165 | B1 | 7/2006 |
| KR | 10-2007-0030004 | A | 3/2007 |
| KR | 10-2011-0054144 | A | 5/2011 |
| KR | 10-2011-0065013 | A | 6/2011 |
| KR | 10-1342613 | B1 | 1/2014 |
| KR | 10-1399026 | B1 | 5/2014 |
| KR | 10-2014-0082279 | A | 7/2014 |
| KR | 10-2014-0083636 | | 7/2014 |
| KR | 10-1439017 | B1 | 10/2014 |
| KR | 10-1470190 | B1 | 12/2014 |
| KR | 10-2015-0067496 | A | 6/2015 |
| KR | 10-2015-0078545 | A | 7/2015 |
| KR | 10-2015-0133291 | A | 11/2015 |
| KR | 10-2016-0004835 | A | 1/2016 |
| KR | 10-2016-0023850 | A | 3/2016 |
| KR | 10-2016-0089773 | A | 7/2016 |
| KR | 10-2016-0134105 | | 11/2016 |
| KR | 10-2017-0068059 | A | 6/2017 |
| KR | 10-2017-0082761 | A | 7/2017 |
| KR | 10-2017-0093817 | A | 8/2017 |
| KR | 10-2017-0094583 | A | 8/2017 |
| KR | 10-2017-0112692 | | 10/2017 |
| KR | 10-2017-0120334 | | 10/2017 |
| KR | 101779823 | B1 | 10/2017 |
| KR | 10-2017-0121883 | A | 11/2017 |
| KR | 10-2018-0022878 | A | 3/2018 |
| KR | 10-2018-0022900 | A | 3/2018 |
| KR | 10-2018-0023981 | A | 3/2018 |
| KR | 10-2018-0024414 | A | 3/2018 |
| KR | 10-2018-0026243 | | 3/2018 |
| KR | 10-2018-0037312 | A | 4/2018 |
| KR | 20180070401 | | 6/2018 |
| KR | 10-2018-0095240 | A | 8/2018 |
| PL | 410262 | A1 | 6/2016 |
| TW | 201515889 | A | 5/2015 |
| WO | WO 9930919 | A1 | 6/1999 |
| WO | 2010-088869 | A1 | 8/2010 |
| WO | WO 2011158307 | A1 | 12/2011 |
| WO | 2012-131405 | A1 | 10/2012 |
| WO | WO 2014015990 | A1 | 1/2014 |
| WO | 2014-154771 | A1 | 10/2014 |
| WO | WO-2016092796 | A1 * | 6/2016 ..... B60K 28/066 |
| WO | WO 2016104042 | A1 | 6/2016 |
| WO | WO 2016-208545 | A1 | 12/2016 |
| WO | 2017-018133 | A1 | 2/2017 |
| WO | WO 2017-060021 | A1 | 4/2017 |
| WO | WO 2017064941 | A1 | 4/2017 |
| WO | 2017-168013 | A1 | 10/2017 |
| WO | WO 2017179710 | A1 | 10/2017 |
| WO | WO 2018-006963 | A1 | 1/2018 |
| WO | 2018-033389 | A1 | 2/2018 |
| WO | WO 2018-020547 | A1 | 2/2018 |
| WO | 2017-017793 | A1 | 6/2018 |

OTHER PUBLICATIONS

Xu Jinqiang, et al., "A Model Study and Simulation of Lane Changing Based on Driving Behaviors" Journal of East China Jiaotong University, vol. 28 No. 6, Dec. 2011.

Bian Ning, et al., "Development and application of semi-automated driving vehicle on highway" Journal of Automotive Safety and Energy Conservation, vol. 8 No. 2, 2017.

European Search Report issued on May 11, 2020 from the corresponding European Application No. 19167265.8, 9 pages.

Office Action issued on Mar. 17, 2021 from the corresponding U.S. Appl. No. 16/378,181, 14 pp.

Notice of Allowance issued on Mar. 23, 2021 from the corresponding U.S. Appl. No. 16/269,140, 9 pp.

Office Action issued on Mar. 26, 2021 from the corresponding U.S. Appl. No. 16/376,612, 29 pp.

Office Action issued on Apr. 15, 2021 from the corresponding U.S. Appl. No. 16/290,376, 27 pp.

Office Action issued on Apr. 22, 2021 from the corresponding U.S. Appl. No. 16/378,203, 35 pp.

Notice of Allowance issued on May 19, 2021 from the corresponding U.S. Appl. No. 16/204,324, 13 pp.

Office Action issued on May 21, 2021 from the corresponding U.S. Appl. No. 16/372,896, 19 pp.

Notice of Allowance issued on May 27, 2021 from the corresponding U.S. Appl. No. 16/376,661, 10 pp.

Office Action issued on Jun. 1, 2021 from the corresponding U.S. Appl. No. 16/192,279, 39 pp.

Wang R. et al., "Analysis on Lane Changing Safety of Vehicle" Mar. 2005, Journal of Jilin University (Engineering and Technology Edition), College of Transportation, Jilin University , Changchun 130022, China.

Zhou, Hui, "Influence of Phase Conversion Prompt on Traffic Operation Efficiency at Intersection", Jilin Railway Vocational Technology College, Jilin 132002, China; 1994-2024 China Academic Journal Electronic Publishing House.

Bi, Yan-Bing, "Warning Algorithm of Changing Lane in Storm Situation", Shenzhen Institute of Information Technology, Shenzhen 518172, China ; 1994-2024 China Academic Journal Electronic Publishing House.

Office Action issued on Dec. 10, 2020 from the corresponding U.S. Appl. No. 16/269,140, 31 pp.

Office Action issued on Dec. 14, 2020 from the corresponding U.S. Appl. No. 16/378,203, 49 pp.

Notice of Allowance issued on Dec. 28, 2020 from the corresponding U.S. Appl. No. 16/206,170, 16 pp.

Office Action issued on Jan. 25, 2021 from the corresponding U.S. Appl. No. 16/192,279, 38 pp.

Notice of Allowance issued on Jan. 25, 2021 from the corresponding U.S. Appl. No. 16/372,937, 31 pp.

Office Action issued on Feb. 11, 2021 from the corresponding U.S. Appl. No. 16/372,896, 26 pp.

Office Action issued on Feb. 11, 2021 from the corresponding U.S. Appl. No. 16/376,661, 24 pp.

Office Action issued on Feb. 17, 2021 from the corresponding U.S. Appl. No. 16/204,324, 30 pp.

Office Action issued on Feb. 17, 2021 from the corresponding U.S. Appl. No. 16/376,576, 56 pp.

European Search Report issued on Jul. 1, 2019 from the corresponding European Application No. 18210398.6, 9 pages.

(56) References Cited

OTHER PUBLICATIONS

European Search Report issued on Jul. 3, 2019 from the corresponding European Application No. 18210063.6, 10 pages.
European Search Report issued on Jul. 18, 2019 from the corresponding European Application No. 18210400.0, 5 pages.
European Search Report issued on Jul. 22, 2019 from the corresponding European Application No. 18210403.4, 8 pages.
European Search Report issued on Jul. 22, 2019 from the corresponding European Application No. 18210401.8, 8 pages.
European Search Report issued on Jul. 25, 2019 from the corresponding European Application No. 18209168.6, 9 pages.
European Search Report issued on Jul. 25, 2019 from the corresponding European Application No. 19156387.3, 8 pages.
European Search Report issued on Aug. 2, 2019 from the corresponding European Application No. 19167271.6, 8 pages.
European Search Report issued on Aug. 22, 2019 from the corresponding European Application No. 19167263.3, 8 pages.
European Search Report issued on Aug. 30, 2019 from the corresponding European Application No. 19167269.0, 9 pages.
European Search Report issued on Aug. 30, 2019 from the corresponding European Application No. 19167261.4, 8 pages.
European Search Report issued on Oct. 2, 2019 from the corresponding European Application No. 19163402.1, 10 pages.
European Search Report issued on Oct. 2, 2019 from the corresponding European Application No. 19162795.9, 8 pages.
European Search Report issued on Oct. 14, 2019 from the corresponding European Application No. 19161253.0, 11 pages.
European Search Report issued on Oct. 18, 2019 from the corresponding European Application No. 19167268.2, 8 pages.
European Search Report issued on Oct. 23, 2019 from the corresponding European Application No. 19167266.6, 9 pages.
European Search Report issued on Mar. 27, 2020 from the corresponding European Application No. 19167264.1, 8 pages.
European Search Report issued on Apr. 21, 2020 from the corresponding European Application No. 19167270.8, 8 pages.
U.S. Office Action issued on Feb. 4, 2020 from the corresponding U.S. Appl. No. 16/296,890, 19 pp.
U.S. Office Action issued on Mar. 25, 2020 from the corresponding U.S. Appl. No. 16/204,362 , 27 pp.
U.S. Office Action issued on Apr. 24, 2020 from the corresponding U.S. Appl. No. 16/203,884 , 25 pp.
Office Action issued on Aug. 12, 2020 from the corresponding U.S. Appl. No. 16/192,279, 60 pages.
Notice of Allowance issued on Sep. 4, 2020 from the corresponding U.S. Appl. No. 16/203,884, 15 pages.
Office Action issued on Sep. 15, 2020 from the corresponding U.S. Appl. No. 16/206,170, 23 pages.
European Search Report dated Mar. 27, 2020 from the corresponding European Application No. 19167264.1, 8 pages.
European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362, 27 pp.
U.S. Office Action dated Apr. 24, 2020 from the corresponding U.S. Appl. No. 16/203,884 , 25 pp.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
Office Action dated Aug. 12, 2020 from the corresponding U.S. Appl. No. 16/192,279, 60 pages.
Notice of Allowance dated Sep. 4, 2020 from the corresponding U.S. Appl. No. 16/203,884, 15 pages.
Office Action dated Sep. 15, 2020 from the corresponding U.S. Appl. No. 16/206,170, 23 pages.
European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
U.S. Office Action for U.S. Appl. No. 16/204,362 dated Oct. 16, 2019, 32 pages.
Office Action dated Dec. 10, 2020 from the corresponding U.S. Appl. No. 16/269,140, 31 pp.
Office Action dated Dec. 14, 2020 from the corresponding U.S. Appl. No. 16/378,203, 49 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279,38 pp.
Notice of Allowance dated Jan. 25, 2021 from the corresponding U.S. Appl. No. 16/372,937, 31 pp.
Office Action dated Feb. 11, 2021 from the corresponding U.S. Appl. No. 16/372,896, 26 pp.
Office Action dated Feb. 11, 2021 from the corresponding U.S. Appl. No. 16/376,661, 24 pp.
Office Action dated Feb. 17, 2021 from the corresponding U.S. Appl. No. 16/204,324, 30 pp.
Office Action dated Feb. 17, 2021 from the corresponding U.S. Appl. No. 16/376,576, 56 pp.
Office Action dated Mar. 17, 2021 from the corresponding U.S. Appl. No. 16/378,181, 14 pp.
Notice of Allowance dated Mar. 23, 2021 from the corresponding U.S. Appl. No. 16/269,140, 9 pp.
Office Action dated Mar. 26, 2021 from the corresponding U.S. Appl. No. 16/376,612, 29 pp.
Office Action dated Apr. 15, 2021 from the corresponding U.S. Appl. No. 16/290,376, 27 pp.
Office Action dated Apr. 22, 2021 from the corresponding U.S. Appl. No. 16/378,203, 35 pp.
Notice of Allowance dated May 19, 2021 from the corresponding U.S. Appl. No. 16/204,324, 13 pp.
Office Action dated May 21, 2021 from the corresponding U.S. Appl. No. 16/372,896, 19 pp.
Notice of Allowance dated May 27, 2021 from the corresponding U.S. Appl. No. 16/376,661, 10 pp.
Office Action dated Jun. 1, 2021 from the corresponding U.S. Appl. No. 16/192,279, 39 pp.

* cited by examiner

VEHICLE DRIVING CONTROLLER, SYSTEM INCLUDING THE SAME, AND METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

The present application claims priority to and the benefit of Korean Patent Application No. 10-2018-0154724, filed in the Korean Intellectual Property Office on Dec. 4, 2018 and U.S. Patent Application No. 62/655,831, filed in the US Patent and Trademark Office on Apr. 11, 2018, the entire contents of which are incorporated herein by reference.

TECHNICAL FIELD

The present disclosure relates to a vehicle driving controller, a system including the same, and a method thereof, and more particularly, relates to technologies about a control authority transition demand according to a driving environment and/or a user state during autonomous driving.

BACKGROUND

The statements in this section merely provide background information related to the present disclosure and may not constitute prior art.

There is a driver assist system for assisting a driver who is driving to perform autonomous driving. For example, the driver assist system may include an adaptive cruise control (ACC), a lane departure warning system (LDWS), a lane keeping system (LKS), and the like.

Such a driver assist system enhances the convenience of driving by automatically controlling a portion of longitudinal control or lateral control of the driver. On the other hand, there are constraints in which such a driver assist system (an autonomous system) should prepare such that the driver intervenes. Thus, in a situation where the driver performs drowsy driving or is unable to drive his or her vehicle due to his or her health problems, a conventional driver assist system does not assist the driver.

When there is a situation to which it is difficult for the driver assist system to correspond, it is important to notify a user that there is the situation depending on a driving situation or a user state and safely hand over control authority to the user. However, in the related art, there are no technologies of warning the user and handing over control authority to the user depending on a driving situation and a user situation.

SUMMARY

An aspect of the present disclosure provides a vehicle driving controller for differently applying a control authority transition demand method depending on a driving environment and/or a user state in an autonomous driving environment such that a user safely corresponds to a risk situation, a system including the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle driving controller may include: a processor configured to differently apply a warning level depending on at least one or more of a driving situation and a user state during autonomous driving and provide a notification of a control authority transition demand to a user and a storage storing information associated with the driving situation and the user state and information associated with a warning level determined by the processor.

The driving situation may include whether there is collision risk within a predetermined time or whether there is out of an operational design domain (ODD) capable of performing the autonomous driving.

The processor may be configured to track a static object and a dynamic object, generate a static grid map and a dynamic object list, and extract map information.

The processor may be configured to generate a driving trajectory of a host vehicle and determine whether there is intersection between the driving trajectory of the host vehicle and the static grid map or whether there is intersection between the driving trajectory of the host vehicle and a trajectory of a dynamic object of the dynamic object list to determine there is collision.

The processor may be configured to determine a time when there is out of the ODD and a type where there is out of the ODD, based on the map information.

The type where there is out of the ODD may include, when a host vehicle is able to travel during a predetermined time after there is out of the ODD and, when the host vehicle is unable to travel after there is out of the ODD.

The processor may be configured to determine at least one or more of whether the user state is a "hands-off" state, whether the user state is an "eyes-off" state, and whether the user state is a "mind-off" state.

The processor may be configured to change and apply a notification reference time, which is a notification time, depending on the user state.

The processor may be configured to set the notification reference time to be shorter in an order of the "hands-off" state, the "eyes-off" state, and the "mind-off" state.

The processor may be configured to determine the warning level to be higher in an order of the "hands-off" state, the "eyes-off" state, and the "mind-off" state.

The processor may be configured to determine whether the user state is the "eyes-off" state or whether the user is the "mind-off" state when there is no driving risk in the driving situation to determine a warning level, provide the notification of the control authority transition demand depending on the determined warning level, and increase the warning level, when a predetermined time elapses.

The processor may be configured to differently apply the warning level depending on an expected time when collision risk will occur or an expected time when there will be out of an ODD.

The warning level may include level 1 for providing a visual warning, level 2 for providing a visual warning and an audible warning, level 3 for providing a visual warning and an audible warning, the visual warning being provided in a color different from a color of the visual warning in levels 1 and 2 and the audible warning being output with a sound higher than the sound upon the audible warning in level 2, and level 4 for providing a visual warning in a color different from the colors in levels 1 to 3, providing an audible warning with the highest sound magnitude, and performing an emergency call mode operation.

The processor may be configured to determine a minimum risk maneuver (MRM) depending on the warning level, when control authority is not handed over to the user after providing the notification of the control authority transition demand depending on the warning level and perform vehicle control depending on the MRM.

The MRM may include at least one of constant-speed driving control after decelerating at a constant speed, stop control, and shoulder stop control.

According to another aspect of the present disclosure, a vehicle system may include: a vehicle driving controller configured to differently apply a warning level depending on at least one or more of a driving situation and a user state during autonomous driving and provide a notification of a control authority transition demand to a user and a warning device configured to provide a warning according to the warning level.

The warning device may be configured to provide at least one or more of a visual warning, an audible warning, and an emergency call mode.

According to another aspect of the present disclosure, a vehicle driving control method may include: determining at least one or more of a driving situation and a user state during autonomous driving and differently applying a warning level depending on at least one or more of the driving situation and the user state and providing a notification of a control authority transition demand to a user.

The method may further include determining an MRM depending on the warning level, when control authority is not handed over to the user after providing the notification of the control authority transition demand depending on the warning level and performing vehicle control depending on the MRM.

The driving situation may include whether there is collision risk within a predetermined time or whether there is out of an ODD capable of performing the autonomous driving.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
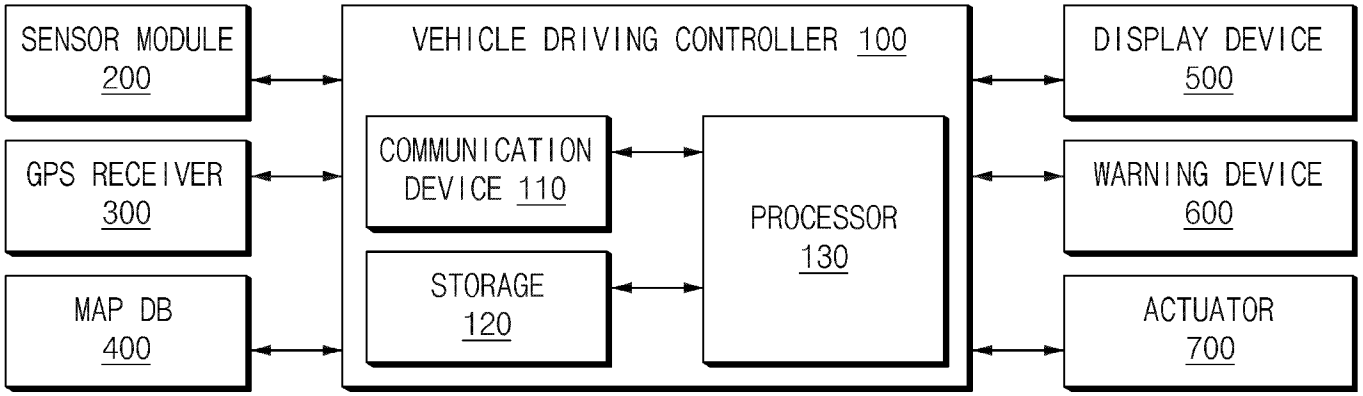
FIG. 1 is a block diagram illustrating a configuration of a vehicle system including a vehicle driving controller in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings. In adding reference denotations to elements of each drawing, although the same elements are displayed on a different drawing, it should be noted that the same elements have the same denotations. In addition, in describing some forms of the present disclosure, if it is determined that a detailed description of related well-known configurations or functions blurs the gist of some forms of the present disclosure, it will be omitted.

In describing elements of some forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Some forms of the present disclosure may be technology of differently applying a warning level depending on a driving environment and/or a user state during autonomous driving, providing a notification of a control authority transition demand to a user, and performing vehicle control depending on a minimum risk maneuver (MRM) when control authority is not handed over to the user and may be applied to autonomous driving technology.

Hereinafter, a description will be given in detail of some forms of the present disclosure with reference to FIGS. 1 to 10.

FIG. 1 is a block diagram illustrating a configuration of a vehicle system including a vehicle driving controller in some forms of the present disclosure.

Referring to FIG. 1, the vehicle system may include a vehicle driving controller 100, a sensor module 200, a global positioning system (GPS) receiver 300, a map database (DB) 400, a display device 500, a warning device 600, and an actuator 700.

The vehicle driving controller 100 may differently apply a warning level depending on at least one or more of a driving situation and/or a user state during autonomous driving and may provide a notification of a control authority transition demand to a user. Furthermore, when the user does not take over control authority after receiving the notification of the control authority transition demand, the vehicle driving controller 100 may determine a minimum risk maneuver (MRM) depending on a warning level and may perform autonomous driving control of a vehicle depending on the determined MRM.

The vehicle driving controller 100 may include a communication device 110, a storage 120, and a processor 130.

The communication device 110 may be a hardware device implemented with various electronic circuits to transmit and receive a signal over a wireless or wired connection. In some forms of the present disclosure, the communication device 110 may perform in-vehicle communication through controller area network (CAN) communication, local interconnect network (LIN) communication, or the like and may communicate with the sensor module 200, the GPS receiver 300, the map DB 400, the display device 500, the warning device 600, the actuator 700, and the like.

The storage 120 may store information associated with a sensing result of the sensor module 200 and information associated with a driving situation, a user state, a warning level, or the like obtained by the processor 130. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communication device 110, the storage 120, or the like and may electrically control the respective components. The processor 130 may be an electrical circuit which executes instructions of software and may perform a variety of data processing and calculation described below.

The processor 130 may differently apply a warning level depending on at least one or more of a driving situation and a user state during autonomous driving to provide a notification of a control authority transition demand. When the user does not take over control authority after receiving the notification of the control authority transition demand, the processor 130 may determine an MRM according to the warning level and may perform autonomous driving control of the vehicle, thus avoiding a risk situation.

In this case, the driving situation may include whether there is collision risk within a predetermined time or whether there is out of an operational design domain (ODD) capable of performing autonomous driving. In other words, the driving situation may refer to situation information associated with whether there is a probability of collision within a predetermined time or whether the vehicle departs from the ODD.

The ODD may be a range set to perform a function of an autonomous system and may be set in consideration of conditions such as a geographic condition, a road condition, an environmental condition, and a driving condition. In other words, for safe driving, it is able to perform a system operation for autonomous driving on a highway, a limited-access road, or the like, but it is unable to perform a system operation for autonomous driving on a general road, a junction/interchange (JC/IC), a tollgate, or the like.

The processor 130 may track a static object and a dynamic object based on information received from the sensor module 200 and the GPS receiver 300 to generate a static grid map and a dynamic object list and may extract map information from the map DB 400. In this case, the dynamic object may be listed on the dynamic object list, and the dynamic object list may include information such as a type or trajectory of the dynamic object.

The processor 130 may generate a driving trajectory of a host device based on information received from the sensor module 200 and the GPS receiver 300 or a navigation device (not shown) and may determine whether the driving trajectory of the host device and the static grid map intersect each other or whether the driving trajectory of the host device and a trajectory of a dynamic object included in the dynamic object list intersect each other to determine whether there is collision. In other words, when there is a point (a point of intersection) where the driving trajectory of the host vehicle and the static grid map meet each other or where the driving trajectory of the host vehicle and the trajectory of the dynamic object meet each other, it is meant that collision occurs.

Furthermore, the processor 130 may determine a time when there is out of an ODD and a type where there is out of the ODD, based on map information. Information about the time when there is the ODD may be time information at a time when there is out of the ODD. Information about the type where there is out of the ODD may include type information when the host vehicle is able to travel during a predetermined time after there is out of the ODD and type information when the host vehicle is unable to travel after there is out of the ODD.

The processor 130 may determine at least one or more of whether the user state is a "hands-off" state, whether the user state is an "eyes-off" state, and whether the user state is a "mind-off" state. The determining of the user state may be determining whether the user is not focused on driving and is in a reckless state. In other words, the "hands-off" state may be a state where the user does not grip a steering wheel. The "eyes-off" state may be a reckless state, for example, a state where the user sees a movie without keeping his or her eyes on the road. The "mind-off" state may be a state where the user is unable to drive the vehicle, for example, a state where the user dozes or gets drunk.

When a state where a value measured by a steering wheel torque sensor is less than a predetermined value and where there is no change in steering angle stays over a predetermined time, the processor 130 may determine that the user does not grip the steering wheel to determine the user state as the "hands-off" state. In this case, the user should be in an "eyes-on" state and a "mind-on" state. The processor 130 may determine the user state as the "eyes-off" state when a time when the user does not keep his or her eyes on the road stays over a predetermined time, based on information about the line of sight of the user, information about a face direction of the user, or the like from image data. In this case, the user should be in the "mind-on" state. The processor 130 may extract information associated with blinking of the eyes of the user, a yawn of the user, or the like based on information about a user look from image data and may determine drowsy driving of the user. Alternatively, when the user is unable to drive the vehicle, the processor 130 may determine the user state as the "mind-off" state. The processor 130 may generate one of a "hands-off" flag, an "eyes-off" flag, or a "mind-off" flag.

When determining a warning level, the processor 130 may determine the warning level to be higher in an order of the "hands-off" state, the "eyes-off" state, and the "mind-off" state and may set a notification reference time (a notification period) to be shorter in an order of the "hands-off" state, the "eyes-off" state, and the "mind-off" state. For example, the processor 130 may determine the notification period to 100 meters when the user state is the "hands-off" state and may determine the notification period to 10 meters when the user state is the "mind-off" state.

In other words, the processor 130 may change and apply the notification reference time, which is a notification time, depending on a user state. The processor 130 may determine that risk increases in an order of the "hands-off" state, the "eyes-off" state, and the "mind-eye" state. In case of the "hands-off" state, the processor 130 may set the notification reference time to be longest. In case of the "mind-off" state, the processor 130 may set the notification reference time to be shortest. For example, when collision is expected at a 100-meter point, the processor 130 may provide a notification of a control authority transition demand at a 50-meter point before the vehicle arrives at a point to collision when the user is in the "hands-off" state or may provide the notification of the control authority transition demand from a 10-meter point before the vehicle arrives at the point to collision when the user is in the "mind-off" state, and may increase a warning level.

When there is no driving risk in a driving situation, the processor 130 may determine whether the user state is the "eyes-off" state or the "mind-off" state to determine a warning level and may provide a notification of a control authority transition demand depending on the determined warning level. When a predetermined time elapses, the processor 130 may increase the warning level.

Moreover, the processor 130 may differently apply a warning level depending on an expected time when collision risk will occur or an expected time when there will be out of an ODD. In other words, the processor 130 may provide a visual warning in warning level 1 and may provide a visual warning and an audible warning together in warning level 2. The processor 130 may provide a visual warning and an audible warning in warning level 3, the visual warning being provided in a color different from a color of the visual warning of warning levels 1 and 2 and the audible warning being output with a sound higher than a sound level upon the audible warning in warning level 2. In warning level 4, the processor 130 may provide a visual warning in a color different from the colors upon the visual warning in warning levels 1 to 3, may provide an audible warning with the highest sound level, and may perform an emergency call mode operation.

After providing a notification of a control authority transition demand depending on a warning level, when control authority is not handed over to the user, the processor 130 may determine an MRM depending on the warning level and may perform vehicle control depending on the MRM. The MRM may include at least one of constant-speed driving control after deceleration at a constant speed, stop control, and shoulder stop control. For example, the processor 130 may perform shoulder stop control in warning level 4 or may perform constant-speed driving control in warning level 1.

The sensor module 200 may include a plurality of sensors for sensing an object outside the vehicle and may obtain information associated with a location of the object, a speed of the object, a movement direction of the object, and/or a type (e.g., a vehicle, a pedestrian, a bicycle, a motorcycle, or the like) of the object. To this end, the sensor module 200 may include an ultrasonic sensor, a radar sensor, a light detection and ranging (LiDAR) sensor, a camera, a laser scanner and/or a corner radar, an acceleration sensor, a yaw rate sensor, a torque sensor and/or a wheel speed sensor, a steering angle sensor, a steering wheel torque sensor, or the like.

In some forms of the present disclosure, the sensor module 200 may sense a dynamic object and a static object around the vehicle by means of the ultrasonic sensor, the radar sensor, the LiDAR sensor, the camera, or the like and may provide the sensed information to the processor 130. Furthermore, the sensor module 200 may obtain information about a line of sight of the user, information about a face direction of the user, or information about a user look from image data of the camera and may obtain information about a steering angle from the steering angle sensor, thus providing the obtained information to the processor 130.

The GPS receiver 300 may receive a GPS signal transmitted from a GPS satellite and may provide the received GPS signal to the processor 130. The GPS signal may be used to ascertain a current location of the vehicle.

The map DB 400 may store map information for controlling autonomous driving of the vehicle and may provide the map information to the processor 130. In this case, the map information may include information associated with a type (e.g., a highway, a limited-access road, a general road, or the like) of a road on which the vehicle is currently traveling, whether there is a tollgate, or whether there is a JC/IC.

The display device 500 may be controlled by the vehicle driving controller 100 to display a visual warning for a notification of a control authority transition demand and differently display a color a visual warning according to a warning level. Furthermore, the display device 500 may display vehicle control information during autonomous driving as well as a control authority transition demand to provide the displayed information to the user.

The display device 500 may be implemented as a head-up display (HUD), a cluster, an audio video navigation (AVN), or the like. Furthermore, the display device 500 may receive a color input or the like directly from the user using a user setting menu (USM) of the cluster. Moreover, the display device 500 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and a three-dimensional (3D) display. Some thereof may be implemented as transparent displays configured as a transparent type or a semi-transparent type to see the outside. Moreover, the display device 500 may be implemented as a touchscreen including a touch panel to be used as an input device other than an output device.

The warning device 600 may output a visual warning or a sound notification (a beep sound) for a notification of a control authority transition demand or may perform an emergency call mode or the like. The warning device 600 may change a color of a visual warning depending on a warning level determined by the processor 130 and may output the changed visual warning, or may change sound strength and may output the changed sound.

Furthermore, the warning device 600 may provide a warning such as a notification of a driving risk situation during autonomous driving. The warning device 600 may have a configuration for providing visual, audible, tactile warnings and may be implemented with a HUD, a cluster, an AVN, a pop-up speaker, or the like.

The actuator 700 may be configured to be controlled by the vehicle driving controller 100 and control a steering angle, acceleration, braking, engine driving, or the like of the vehicle and may include a steering wheel, an actuator interlocked with the steering wheel, and a controller for controlling the actuator, a controller for controlling a brake, a controller for a speed of the vehicle, or a controller, configured to control a transmission of the vehicle, for controlling a gear, a clutch, or the like.

As such, some forms of the present disclosure may determine a driving situation and/or a user state and may determine a warning level and a notification period, thus providing a notification of a control authority transition demand depending on the warning level and the notification period. When the user does not take over control authority, some forms of the present disclosure may continue increasing a warning level to provide a notification or may continue reducing a notification period to provide a notification. Moreover, when the user does not take over control authority, some forms of the present disclosure may determine an MRM according to a warning level and may perform autonomous driving control of the vehicle, thus minimizing a risk situation driving during autonomous driving of the vehicle to perform safe driving.

Figure 2:
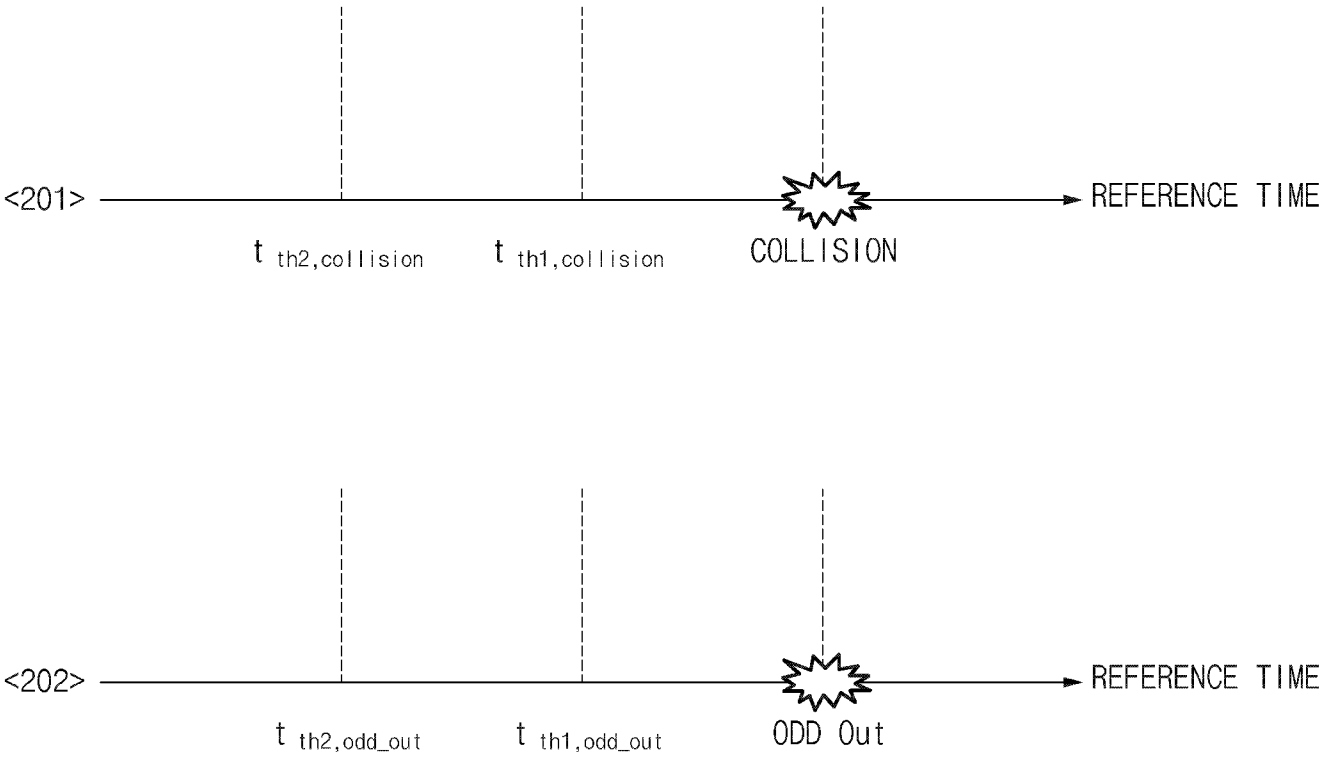
FIG. 2 is a drawing illustrating an exemplary method for determining a warning level upon a driving risk in one form of the present disclosure.

Hereinafter, a description will be given in detail of an example of determining a warning level upon driving risk with reference to FIG. 2. FIG. 2 is a drawing illustrating an exemplary method for determining a warning level upon a driving risk in some forms of the present disclosure. A description will be given of an example of determining a warning level when collision risk occurs and when there is out of an ODD with reference to reference numerals 201 and 202 of FIG. 2.

Notification start condition when there is no driving risk

1. When there is no driving risk, but when an "eyes-off" state continues during a predetermined time, a vehicle driving controller 100 of FIG. 1 may enter warning level 2 and may increase a warning level over time. Subsequently, the vehicle driving controller 100 may increase the warning level to warning levels 3 and 4 and may provide a notification, but when control authority transition is not performed, the vehicle driving controller 100 may perform stop control.

2. When there is no driving risk, but when a "mind-off" state continues during a predetermined time, the vehicle driving controller 100 may enter warning level 3 and may increase a warning level over time. The vehicle driving controller 100 may enter warning level 4 and may provide a notification, but when control authority transition is not performed, the vehicle driving controller 100 may perform shoulder stop control.

Notification start condition when there is driving risk

1. State where collision risk is expected.

① collision occurs after a first reference time $t_{th1,collision}$

Warning 2 level when a user in a "hands-off" state

Stop control when the user in an "eyes-off" state and in case of warning 2 level Shoulder stop control when the user in a "mind-off" state and in case of warning level 3

② Collision occurs after a second reference time $t_{th2,collision}$ shorter than the first reference time $t_{th1,\ collision}$ (between the second reference time and the first reference time)

Stop control when the user in the "hands-off" state and in case of warning 3 level Stop control when the user in the "eyes-off" state and in case of warning 4 level Shoulder stop control when the user in the "mind-off" state and in case of warning level 4

2. State where there will be out of an ODD

① There is out of the ODD after a first reference time $t_{th1,odd_out}$

Constant-speed driving control when the user in the "hands-off" state and in case of warning 1 level Constant-speed driving control when the user in the "eyes-off" state and in case of warning 2 level Shoulder stop control when the user in the "mind-off" state and in case of warning level 3

② There is out of the ODD after a second reference time $t_{th2,odd_out}$ shorter than the first reference time $t_{th1,odd_out}$ (between the second reference time and the first reference time)

Constant-speed driving control when the user in the "hands-off" state and in case of warning 2 level Stop control when the user in the "eyes-off" state and in case of warning 3 level Shoulder stop control when the user in the "mind-off" state and in case of warning level 4

Figure 3:
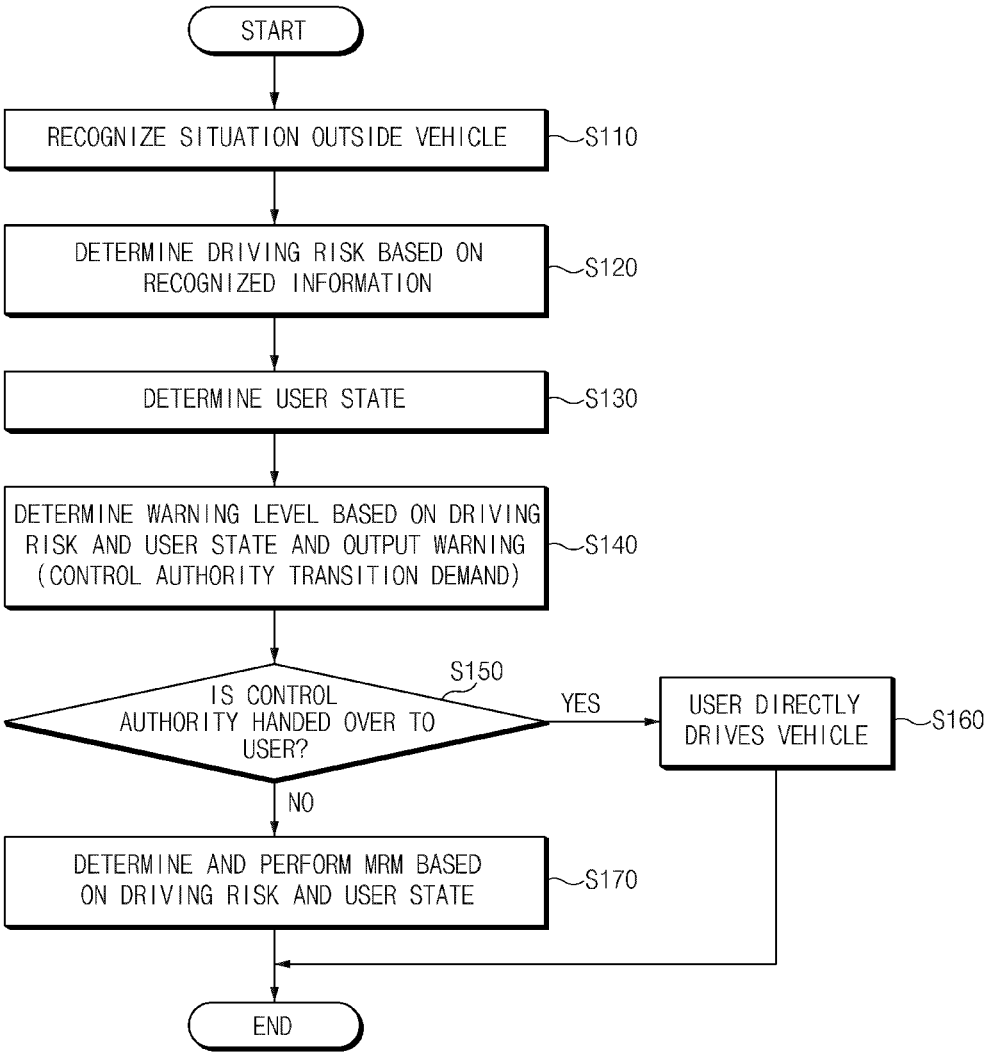
FIG. 3 is a flowchart illustrating a vehicle driving control method in one form of the present disclosure.

Hereinafter, a description will be given in detail of a vehicle driving control method in some forms of the present disclosure with reference to FIG. 3. FIG. 3 is a flowchart illustrating a vehicle driving control method in some forms of the present disclosure.

Hereinafter, it is assumed that a vehicle driving controller 100 of FIG. 1 performs a process of FIG. 3. Furthermore, in a description of FIG. 3, an operation described as being performed by the vehicle driving controller 100 may be understood as being controlled by a processor 130 of the vehicle driving controller 100.

Referring to FIG. 3, in operation S110, the vehicle driving controller 100 may recognize a situation outside a host vehicle based on information received from a sensor module 200, a GPS receiver 300, and a map DB 400. In this case, the recognizing of the situation outside the host vehicle may include generating a static grid map through tracking of a static object, generating a dynamic object list through tracking of a dynamic object, or extracting map information.

In operation S120, the vehicle driving controller 100 may determine driving risk based on the recognized information. Based on the static grid map and the dynamic object list, the vehicle driving controller 100 may determine whether a driving trajectory of the host vehicle and a static grid map intersects each other and may determine whether the driving trajectory of the host vehicle and a trajectory of a dynamic object intersect each other to determine whether there is collision and a time to collision (TTC). Furthermore, the vehicle driving controller 100 may determine whether there is out of an ODD based on map information. In other words, the vehicle driving controller 100 may output information about a type where there is out of the ODD and information about a time when there is out of the ODD, based on map information.

In operation S130, the vehicle driving controller 100 may determine a user state based on information received from the sensor module 200. In this case, the user state may include at least one or more of a "hands-off" state, an "eyes-off" state, or a "mind-off" state.

In operation S140, the vehicle driving controller 100 may determine a warning level based on the driving risk and the user state and may output a warning (a control authority transition demand).

When the user takes over control authority in operation S150 after outputting the warning, in operation S160, the user may directly drive the host vehicle. When the user does not take over the control authority in operation S150, in operation S170, the vehicle driving controller 100 may determine an MRM based on the driving risk and the user state and may perform vehicle control according to the MRM.

Figure 4A:
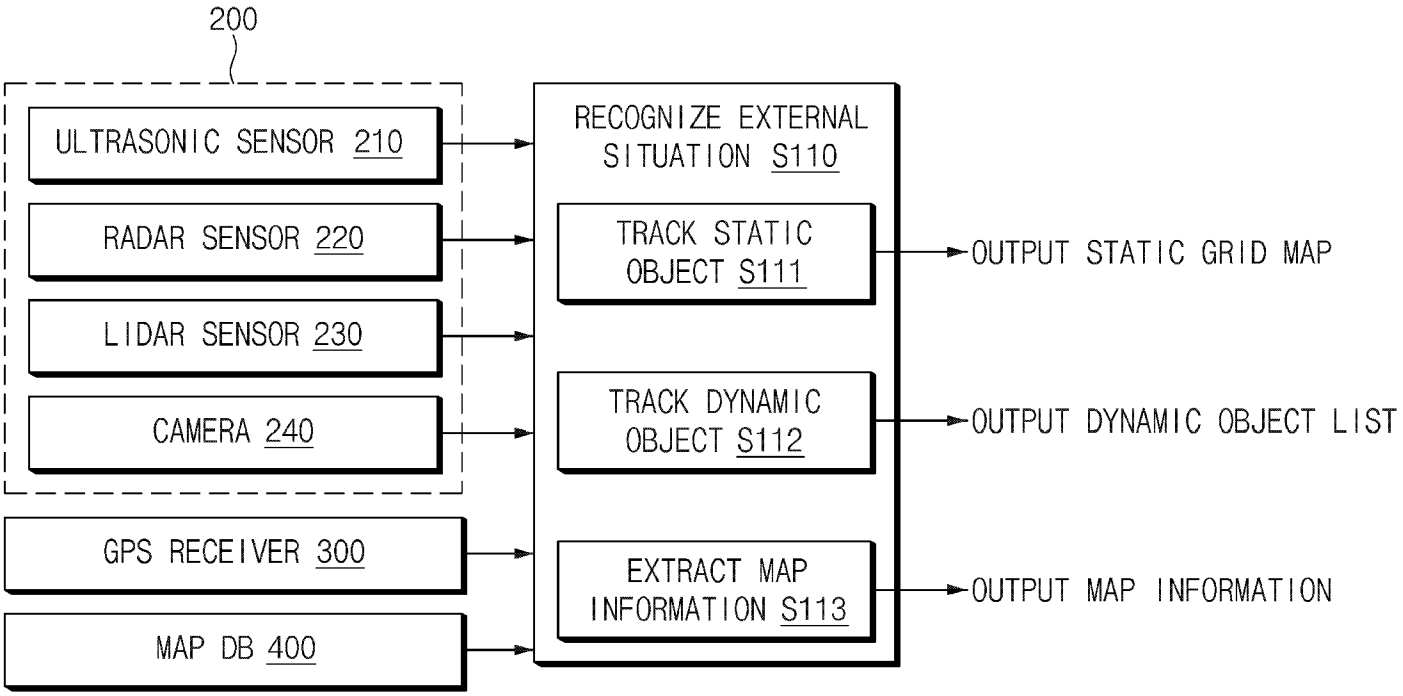
FIG. 4A is a drawing illustrating an exemplary operation of recognizing a situation outside a vehicle in a vehicle driving controller in one form of the present disclosure.

FIG. 4A is a drawing illustrating an exemplary operation of recognizing a situation outside a vehicle in a vehicle driving controller in some forms of the present disclosure.

Referring to FIG. 4A, a vehicle driving controller 100 of FIG. 1 may track (S111) a static object to output a static grid map, may track (S112) a dynamic object to generate and output a dynamic object list, and may extract map information to output the map information, based on information received via an ultrasonic sensor 210, a radar sensor 220, a LiDAR sensor 230, a camera 240, a GPS receiver 300, or a map DB 400.

In this case, the vehicle driving controller 100 may represent and output a static object of a surrounding environment on a grid map and may predict a location of a dynamic object, a speed of the dynamic object, an acceleration of the dynamic object, a current driving lane, and a driving trajectory to generate and output a dynamic object list. Furthermore, the vehicle driving controller 100 may search for a section where the host vehicle is currently traveling, based on a current location and a map DB and may transmit geographic/road information about the section where the host vehicle is currently traveling. In this case, the geographic/road information may include information associated with a main line of a highway, a JC/IC, a tollgate, a limited-access road, a general road, or the like.

Figure 4B:
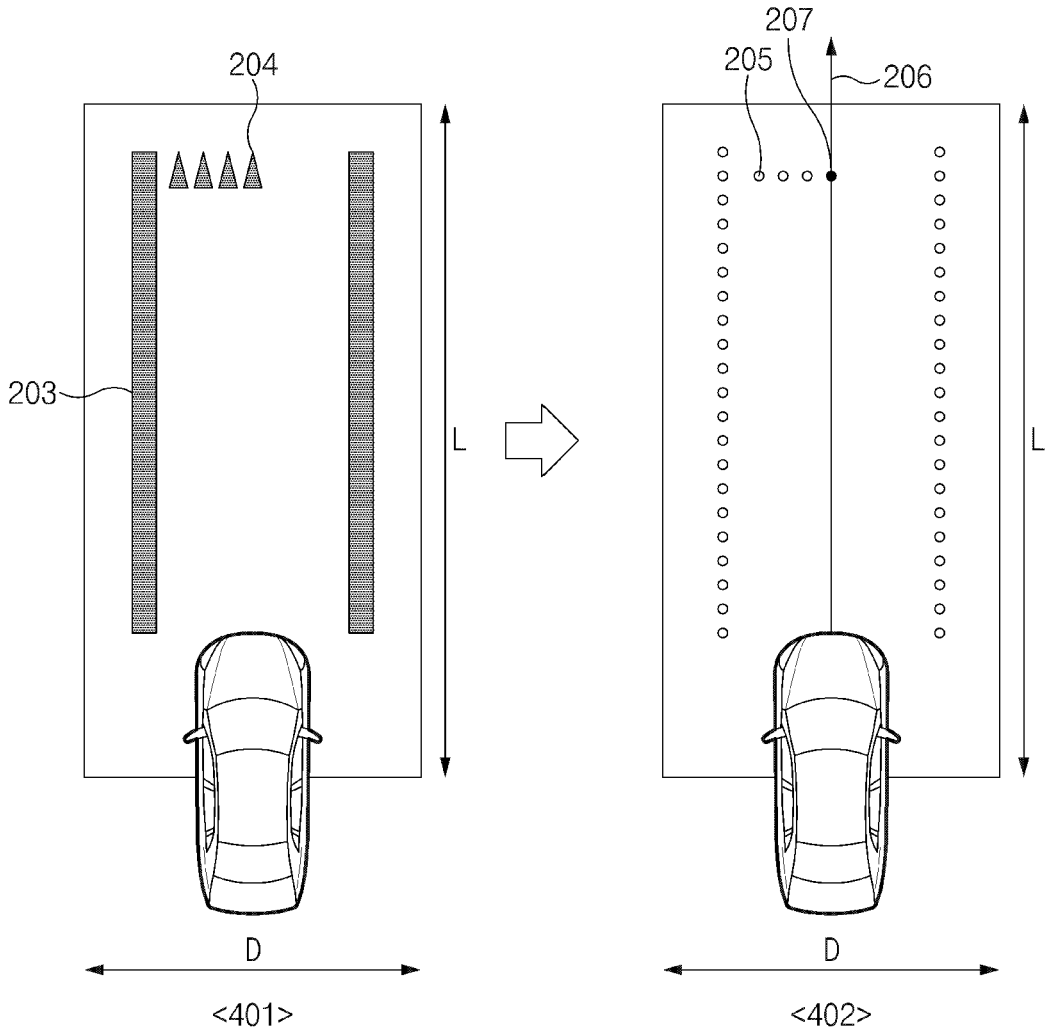
FIG. 4B is a drawing illustrating an example of extracting a shape of a static object and generating a static grid map in one form of the present disclosure.

FIG. 4B is a drawing illustrating an example of extracting a shape of a static object and generating a static grid map in some forms of the present disclosure.

As shown reference numeral 401 of FIG. 4B, after static objects 203 and 204 are detected from a radar sensor 220, a LiDAR sensor 230, or a camera 240 of FIG. 4A, when shapes of the static objects 203 and 204 are extracted, as shown in reference numeral 402, a vehicle driving controller 100 of FIG. 1 may represent the shapes of the static objects 203 and 204 as points 205 of a grid map.

Figure 5:
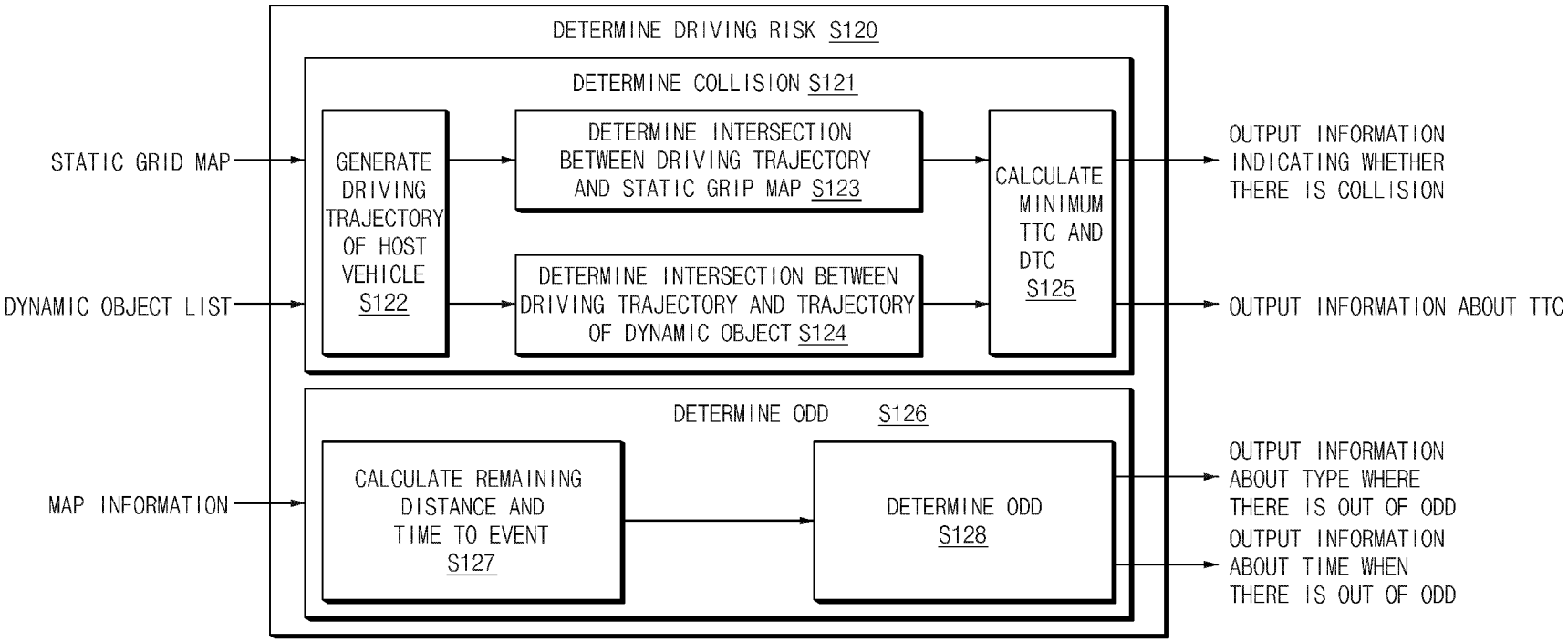
FIG. 5 is a drawing illustrating an exemplary operation of determining a driving risk in a vehicle driving controller in one form of the present disclosure.

FIG. 5 is a drawing illustrating an exemplary operation of determining a driving risk in a vehicle driving controller in some forms of the present disclosure.

Referring to FIG. 5, in operation S121, a vehicle driving controller 100 of FIG. 1 may determine collision using a static grid map and a dynamic object list. In operation S126, the vehicle driving controller 100 may determine whether there is out of an ODD using map information or the like.

In operation S122, the vehicle driving controller 100 may generate a driving trajectory of a host vehicle based on a current driving lane. In operation S123, the vehicle driving controller 100 may determine whether there is a point of intersection between the driving trajectory of the host vehicle and a grid map. In operation S124, the vehicle driving controller 100 may determine whether there is a point of intersection between the driving trajectory of the host vehicle and a trajectory of a dynamic object. The vehicle driving controller 100 may determine whether there is a point 207 of intersection between a static object 205 shaped with points of a grid map 402 generated shown in FIG. 4B and a driving trajectory 206 of the host vehicle. In this case, the occurrence of the point 207 of intersection may mean that collision occurs, and a time to the point 207 of intersection may refer to a TTC of a static object and a dynamic object. In operation S125, the vehicle driving controller 100 may calculate a minimum TTC and distance to collision (DTC).

In operation S127, the vehicle driving controller 100 may calculate the remaining distance and time to an event from map information based on location information of the host vehicle. In operation S128, the vehicle driving controller 100 may determine an ODD. In this case, the ODD may refer to a domain capable of performing autonomous driving, and the event may refer to a point capable of performing autonomous driving. For example, when the host vehicle travels on a highway which belongs to a range of the ODD and then travels on a general road which is not within the range of the ODD, the vehicle driving controller 100 may regard a domain before the host vehicle enters the general road (event) as the ODD and may determine a time when the host vehicle enters the general road as a point where there is out of the ODD.

A type where there is out of the ODD may be classified as i) the host vehicle is able to travel after there is out of the ODD and ii) the host vehicle is unable to travel after there is out of the ODD. Furthermore, when the host vehicle is able to travel after there is out of the ODD may include when the host vehicle exits from a highway and then enters a general road or when the host vehicle is affected by weather such as rain or the like. When the host vehicle is unable to travel after there is out of the ODD may include when there is a line which disappears or when there is no line.

Figure 6:
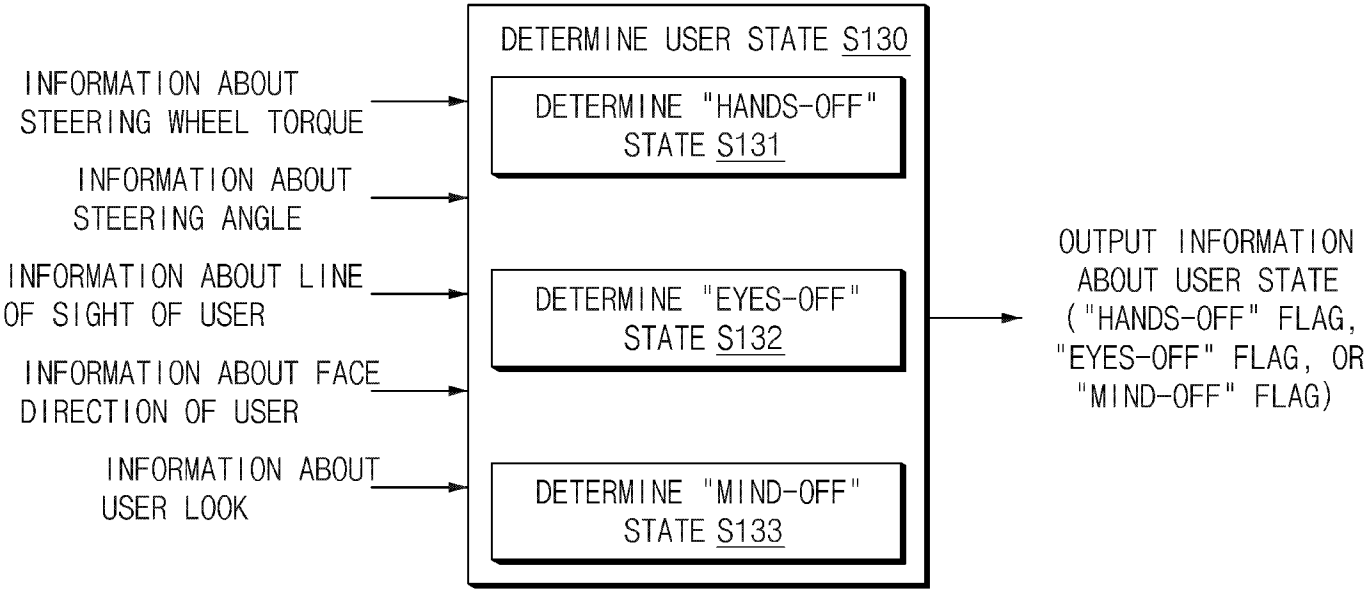
FIG. 6 is a drawing illustrating an exemplary operation of determining a user state in a vehicle driving controller in one form of the present disclosure.

FIG. 6 is a drawing illustrating an exemplary operation of determining a user state in a vehicle driving controller in some forms of the present disclosure.

Referring to FIG. 6, a vehicle driving controller 100 of FIG. 1 may determine a user state. For example, the vehicle driving controller 100 may determine whether the user state is a "hands-off" state, an "eyes-off" state, or a "mind-off" state. In this case, the "hands-off" state may be a state where a user does not grip a steering wheel. The "eyes-off" state may be a state where the user closes his or her eyes. The "mind-off" state may be state where the user is drowsy. A "hands-on" state, an "eyes-on" state, or a "mind-on" state may refer to a state respectively opposite to the "hands-off" state, the "eyes-off" state, or the "mind-off" state.

In operation S131, the vehicle driving controller 100 may determine whether the user state is the "hands-off" state based on information about a steering wheel torque and information about a steering angle. For example, when a state where a value measured by a steering wheel torque sensor is less than a predetermined value and where there is no change in steering angle stays over a predetermined time, the vehicle driving controller 100 may determine that the user does not grip the steering wheel to generate a "hands-off" flag. In this case, the user should be in the "eyes-on" state and the "mind-on" state.

In operation S132, the vehicle driving controller 100 may determine whether the user state is the "eyes-off" state based on information about a line of sight of the user and information about a face direction of the user. For example, the vehicle driving controller 100 may track a line of sight of the user and a face direction of the user. When a time when the user does not keep his or her eyes on the road stays over a predetermined time, the vehicle driving controller 100 may generate an "eyes-off" flag. In this case, the user should be in the "mind-on" state.

In operation S133, the vehicle driving controller 100 may determine whether the user state is the "mind-off" state using information about a user look from image data of a camera. For example, the vehicle driving controller 100 may determine a state where the user is drowsy and a state where the user is unable to currently drive the vehicle through blinking of the eyes of the user, a yawn of the user, or the like to generate a "mind-off" flag.

Figure 7:
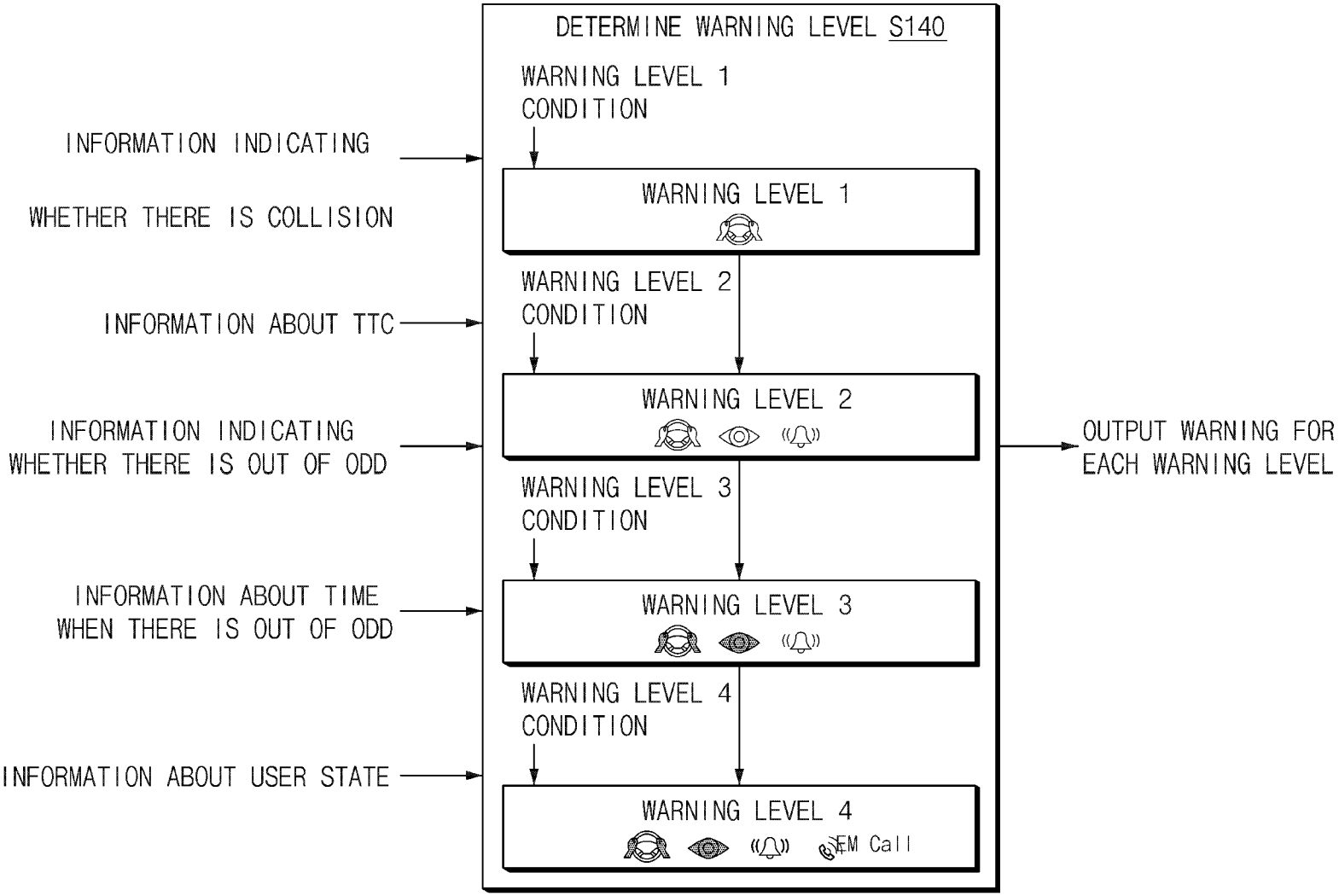
FIG. 7 is a drawing illustrating an exemplary operation of determining a warning level in a vehicle driving controller in one form of the present disclosure.

FIG. 7 is a drawing illustrating an exemplary operation of determining a warning level in a vehicle driving controller in some forms of the present disclosure.

Referring to FIG. 7, in operation S140, a vehicle driving controller 100 of FIG. 1 may determine a warning level using information about whether there is collision, information about a TTC, information about whether there is out of an ODD, information about a time when there is out of the ODD, information about a user state, or the like.

When a "hands-off" state occurs, the vehicle driving controller 100 may provide a notification of a control authority transition demand in warning level 1. In this case, the vehicle driving controller 100 may provide a visual warning.

When the "hands-off" state or an "eyes-off" state occurs, the vehicle driving controller 100 may provide a notification of a control authority transition demand in warning level 2. In this case, the vehicle driving controller 100 may provide a visual warning and a sound notification (a beep sound) in warning level 2.

When the "hands-off" state or the "eyes-off" state occurs, the vehicle driving controller 100 may provide a notification of a control authority transition demand in warning level 3. In this case, the vehicle driving controller 100 may provide a visual warning and a sound notification (a beep sound) in warning level 3, and may output a color different from a color of the visual warning in warning level 2 or may output a level of a notification sound to be higher.

When the hands-off state or the "eyes-off" state occurs, the vehicle driving controller 100 may provide a notification of a control authority transition demand in warning level 4. In this case, the vehicle driving controller 100 may provide a visual warning, a sound notification (a beep sound), and an emergency call mode in warning level 4. In this case, when providing the visual warning and the sound notification, the vehicle driving controller 100 may output a color of the visual warning different from the color of the visual warning in warning level 2 or 3 and may output sound strength stronger than the sound strength in warning level 3.

In FIG. 7, some forms of the present disclosure are exemplified as the vehicle driving controller 100 provides the visual warning, the audible warning, and the emergency call mode for each warning level. However, some forms of the present disclosure are not limited thereto. For example, the vehicle driving controller 100 may provide a warning through various methods capable of providing a warning (notification) such as a tactile warning.

Figure 8:
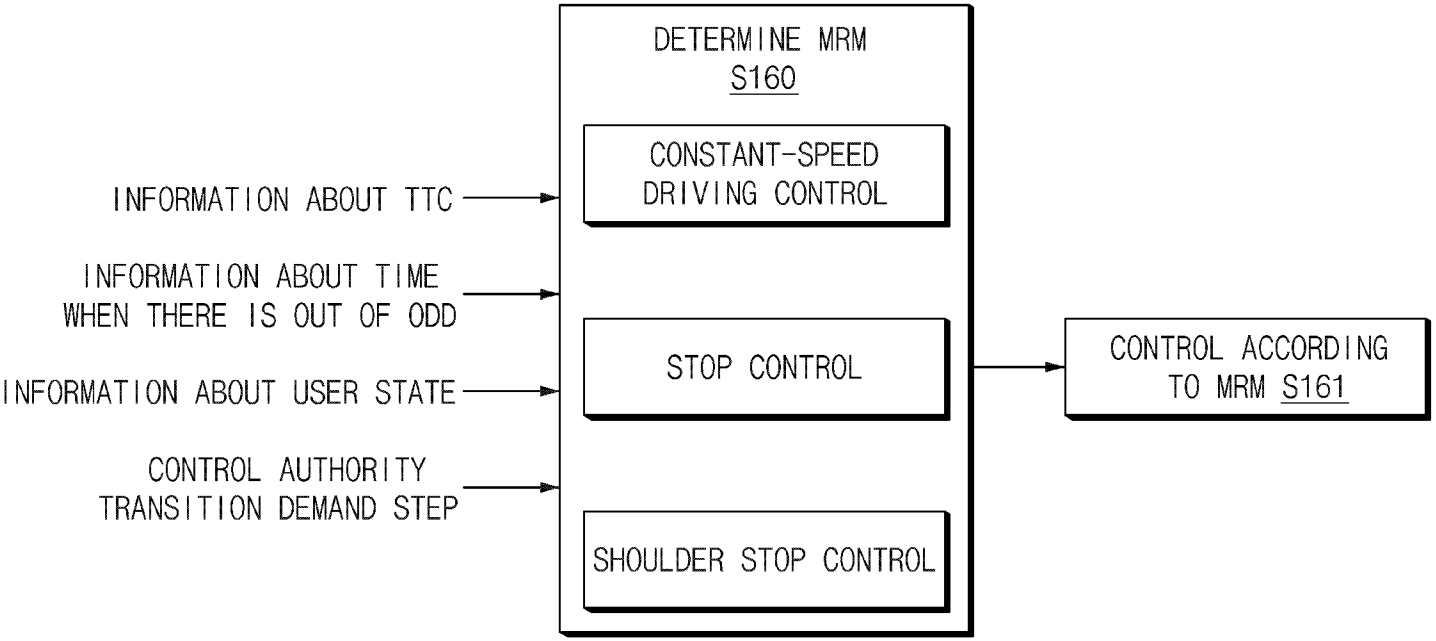
FIG. 8 is a drawing illustrating an exemplary operation of determining a minimum risk maneuver (MRM) in a vehicle driving controller in one form of the present disclosure.

FIG. 8 is a drawing illustrating an exemplary operation of determining an MRM in a vehicle driving controller in some forms of the present disclosure.

Referring to FIG. 8, after providing a notification of a control authority transition demand, when a user does not take over control authority, in operation S160, a vehicle driving controller 100 of FIG. 1 may determine an MRM. In operation S161, the vehicle driving controller 100 may control a vehicle depending on the MRM.

The vehicle driving controller 100 may determine one of constant-speed driving control for performing constant-speed driving after decelerating at a constant speed, stop control for stopping on a corresponding lane, or shoulder stop control for changing a lane to a shoulder and stopping on the shoulder, using such an MRM.

The vehicle driving controller 100 may determine an MRM depending on driving risk and a user state. When the notification of the control authority transition demand is started, the vehicle driving controller 100 may gradually increase a warning level over time to provide the notification of the control authority transition demand and may provide the notification of the control authority transition demand in the highest level in the warning level. When the user does not take over control authority, the vehicle driving controller 100 may determine an MRM and may perform vehicle control.

Figure 9:
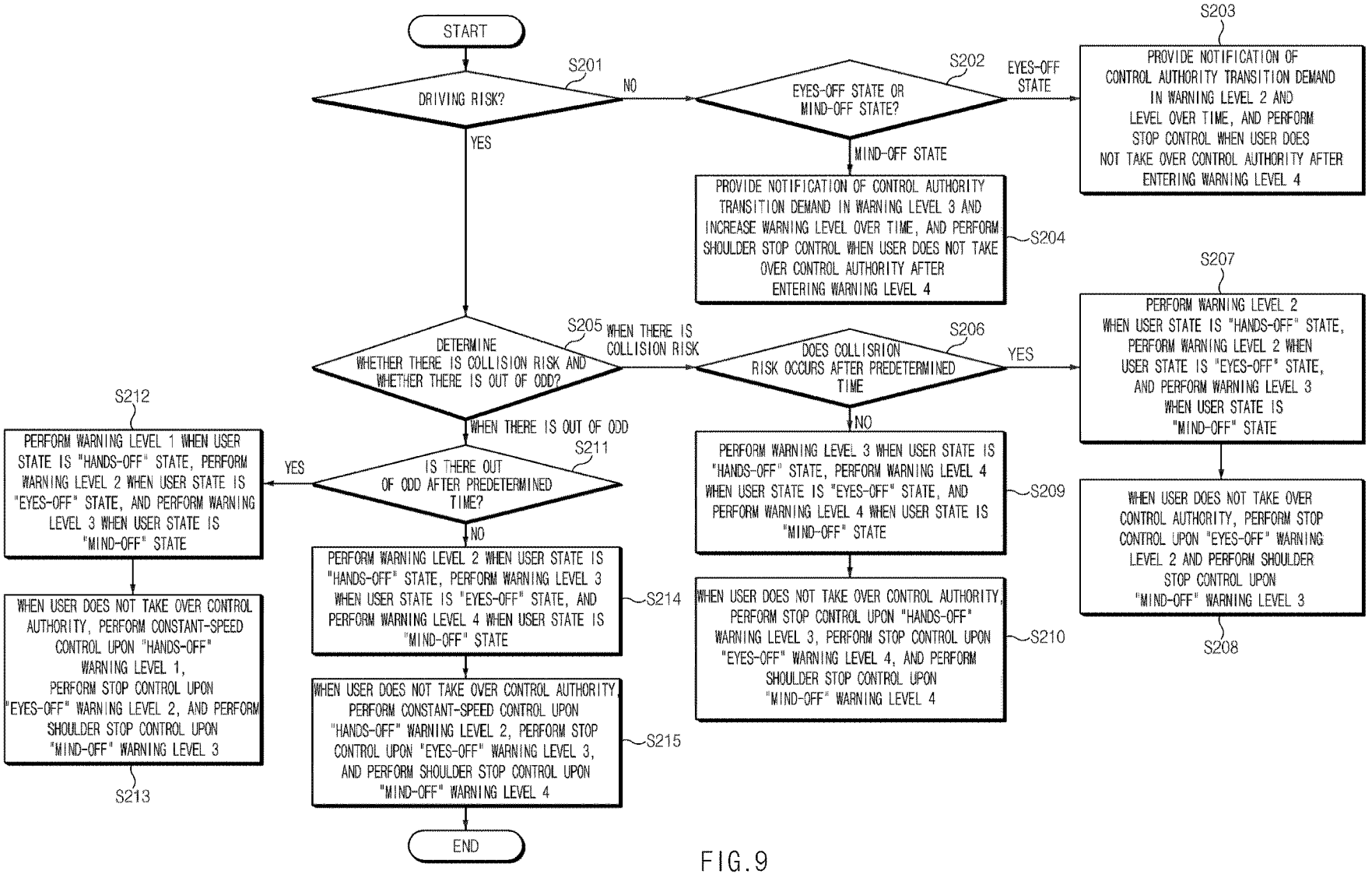
FIG. 9 is a flowchart illustrating a method for determining a warning level according to a driving environment and determining an MRM according to the warning level, in one form of the present disclosure.

Hereinafter, a description will be given in detail of a method for determining a warning level according to a driving environment and determining an MRM according to a warning level in some forms of the present disclosure. FIG. 9 is a flowchart illustrating a method for determining a warning level according to a driving environment and determining an MRM according to the warning level in some forms of the present disclosure.

Hereinafter, it is assumed that a vehicle driving controller 100 of FIG. 1 performs a process of FIG. 9. Furthermore, in a description of FIG. 9, an operation described as being performed by the vehicle driving controller 100 may be understood as being controlled by a processor 130 of the vehicle driving controller 100.

Referring to FIG. 9, in operation S201, the vehicle driving controller 100 may determine whether there is driving risk. When there is no the driving risk, in operation S202, the vehicle driving controller 100 may determine whether the user state is an "eyes-off" state or a "mind-off" state. In this case, when there is no the driving risk, the vehicle driving controller 100 may fail to determine whether the user state is a "hands-off" state. In other words, since the vehicle driving controller 100 is a system activated in the "hands-off" state and an "eyes-on" state, it may fail to provide a "hands-off" warning.

When the user state is the "eyes-off" state in operation S202, in operation S203, the vehicle driving controller 100 may provide a notification of a control authority transition demand in warning level 2, may increase a warning level over time, and may perform stop control when a user does not take over control authority after entering warning level 4.

When the user state is the "mind-off" state in operation S202, in operation S204, the vehicle driving controller 100 may provide the notification of the control authority transition demand in warning level 3, may increase the warning level over time, and may perform shoulder stop control when the user does not take over control authority after entering warning level 4.

Meanwhile, when there is the driving risk in operation S201, in operation S205, the vehicle driving controller 100 may determine whether there is collision risk and whether there is out of an ODD.

When there is the collision risk in operation S205, in operation S206, the vehicle driving controller 100 may determine whether the collision risk occurs after a predetermined time.

When the collision risk occurs after the predetermined time, the vehicle driving controller 100 may determine a warning level depending on a user state.

For example, when the collision risk occurs after the predetermined time, in operation S207, the vehicle driving controller 100 may provide the notification of the control authority transition demand in warning level 2 when the user state is the "hands-off" state, may provide the notification of the control authority transition demand in warning level 2 when the user state is the "eyes-off" state, and may provide the notification of the control authority transition demand in warning level 3 when the user state is the "mind-off" state.

When the user does not take over the control authority, in operation S208, the vehicle driving controller 100 may perform stop control when providing the notification of the control authority transition demand in "eyes-off" warning level 2 and may perform shoulder stop control in "mind-off" warning level 3.

Meanwhile, when the collision is expected earlier (faster) than the predetermined time rather than after the predetermined time, in operation S209, the vehicle driving controller 100 may provide the notification of the control authority transition demand in warning level 3 when the user state is the "hands-off" state, may provide the notification of the control authority transition demand in warning level 4 when the user state is the "eyes-off" state, and provide the notification of the control authority transition demand in warning level 4 when the user state is the "mind-off" state.

After providing the notification of the control authority transition demand, when the user does take over the control authority, in operation S210, the vehicle driving controller 100 may perform stop control upon "hands-off" warning level 3, may perform stop control upon "eyes-off" warning level 4, and may perform shoulder stop control upon "mind-off" warning level 4.

When it is determined that there is out of the ODD in operation S205, in operation S211, the vehicle driving controller 100 may determine whether there is out of the ODD after a predetermined time.

When there is out of the ODD after the predetermined time, in operation S212, the vehicle driving controller 100 may provide the notification of the control authority transition demand in warning level 1 when the user state is the "hands-off" state, may provide the notification of the control authority transition demand in warning level 2 when the user state is the "eyes-off" state, and may provide the notification of the control authority transition demand in warning level 3 when the user state is the "mind-off" state.

After providing the notification of the control authority transition demand, when the user does not take over the control authority, in operation S213, the vehicle driving controller 100 may perform constant-speed driving control upon "hands-off" warning level 1, may perform stop control upon "eyes-off" warning level 2, and may perform shoulder stop control upon "mind-off" warning level 3.

Meanwhile, when it is determined that there is out of the ODD easier than the predetermined time in operation S211, in operation S214, the vehicle driving controller 100 may provide the notification of the control authority transition demand in warning level 2 when the user state is the "hands-off" state, may provide the notification of the control authority transition demand in warning level 3 when the user state is the "eyes-off" state, and may provide the notification of the control authority transition demand in warning level 4 when the user state is the "mind-off" state.

After providing the notification of the control authority transition demand, when the user does not take over the control authority, in operation S215, the vehicle driving controller 100 may perform constant-speed driving control upon "hands-off" warning level 2, may perform stop control upon "eyes-off" warning level 3, and may perform shoulder stop control upon "mind-off" warning level 4.

Figure 10:
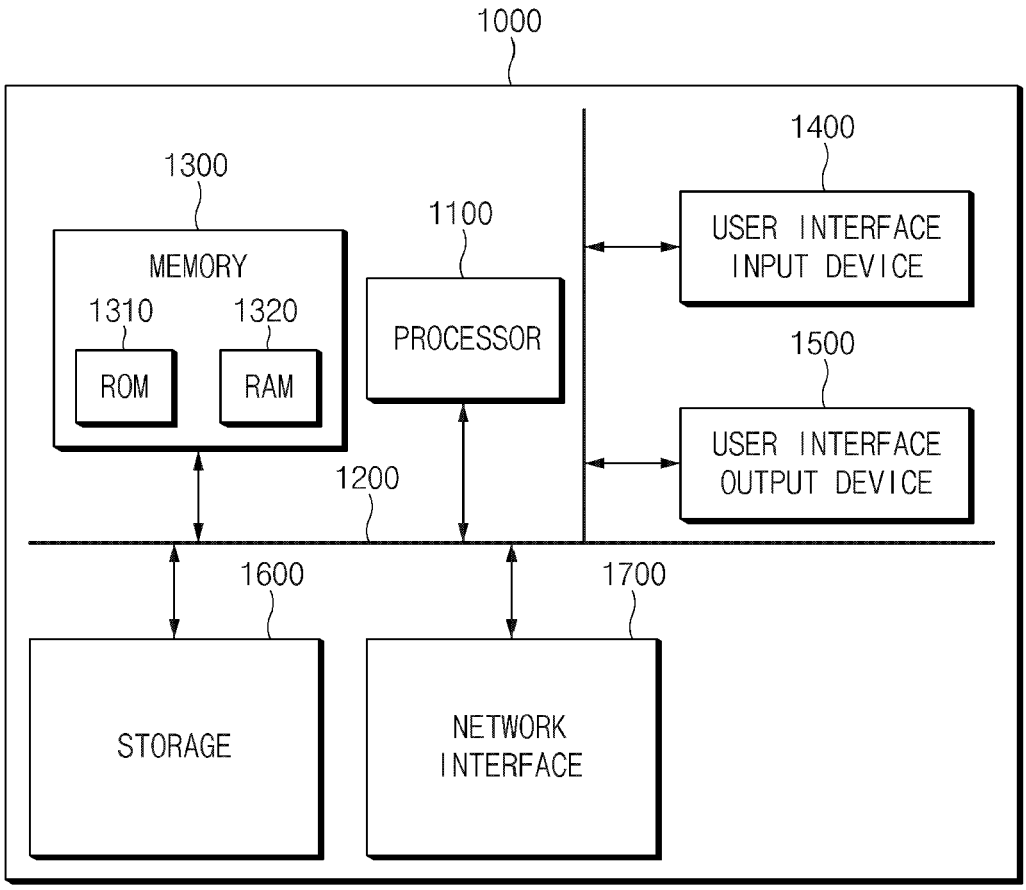
FIG. 10 is a block diagram illustrating a configuration of a computing system in one form of the present disclosure.

FIG. 10 is a block diagram illustrating a configuration of a computing system in some forms of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with some forms of the present disclosure disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The technology of the present disclosure may differently apply a control authority transition demand method depending on a driving environment and/or a user state in an autonomous driving environment such that the user safely copes with a risk situation.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle driving controller, comprising:

a processor configured to *perform algorithms to*:

apply a different [warning level] *level of warnings* depending on at least one of a driving situation or a user state during autonomous driving; and provide a notification of a control authority transition demand to a user; and a storage configured to store information regarding the driving situation and the user state, and information regarding the different [warning level] *level of warnings*, wherein the processor is configured to *perform algorithms to*:

[apply] *provide* the different [the warning level] *level of warnings to the user* depending on an expected time of collision risk or an expected time of a deviation of an operational design domain (ODD); and determine different minimum risk maneuvers (MRMs) depending on the [applied] *provided* different [warning level] *level of warnings* when a control authority is not handed over to the user after providing the notification of the control authority transition demand *to the user* depending on the [applied] *provided* different [warning level] *level of warnings*.

2. The vehicle driving controller of claim 1, wherein the driving situation comprises:

whether there is the collision risk within a predetermined amount of time; and whether there is the deviation of the ODD that is configured to perform the autonomous driving.

3. The vehicle driving controller of claim 1, wherein the processor is configured to *perform algorithms to*:

track a static object and a dynamic object;

generate a static grid map and a dynamic object list; and extract map information.

4. The vehicle driving controller of claim 3, wherein the processor is configured to *perform algorithms to*:

generate a driving trajectory of a host vehicle;

determine whether there is intersection between the driving trajectory of the host vehicle and the static grid map or whether there is intersection between the driving trajectory of the host vehicle and a trajectory of a dynamic object of the dynamic object list; and determine whether there is collision.

5. The vehicle driving controller of claim 3, wherein the processor is configured to *perform algorithms to*:

determine a deviation time of the ODD and a deviation type of the ODD based on the map information.

6. The vehicle driving controller of claim 5, wherein the deviation type of the ODD comprises:

when the host vehicle is capable of travelling for a predetermined amount of time after the deviation of the ODD; and when the host vehicle is incapable of travelling after the deviation of the ODD.

7. The vehicle driving controller of claim 1, wherein the processor is configured to *perform algorithms to*:

determine at least one of the user state including a hands-off state, an eyes-off state, and a mind-off state.

8. The vehicle driving controller of claim 7, wherein the processor is configured to *perform algorithms to*:

change and apply a notification reference time depending on the user state.

9. The vehicle driving controller of claim 8, wherein the processor is configured to *perform algorithms to*:

decrease the notification reference time in an order of the hands-off state, the eyes-off state, and the mind-off state.

10. The vehicle driving controller of claim 7, wherein the processor is configured to *perform algorithms to*:

increase [the warning level] *the level of warnings* in the order of the hands-off state, the eyes-off state, and the mind-off state.

11. The vehicle driving controller of claim 7, wherein the processor is configured to *perform algorithms to*:

determine whether the user state is the eyes-off state or the mind-off state when no driving risk is present in the driving situation;

determine [the warning level] *the level of warnings* based on the determined user state;

provide the notification of the control authority transition demand depending on the determined [warning] level *of warnings*; and increase the [warning level] *level of warnings* when a predetermined amount of time elapses.

12. The vehicle driving controller of claim 1, wherein [applied] *provided* different [the warning level] *level of warnings* comprises:

level 1 configured to provide a level 1 visual warning;

level 2 configured to provide a level 2 visual warning and a level 2 audible warning;

level 3 configured to:

provide a level 3 visual warning in a color that is different from a color of the level 1 visual warning and a color of the level 2 visual warning; and provide a level 3 audible warning that is louder than the level 2 audible warning; and level 4 configured to:

provide a level 4 visual warning in a color that is different from the color of the level 1 visual warning, the color of the level 2 visual warning, and the color of the level 3 visual warning;

provide a level 4 audible warning with a highest sound magnitude; and perform an emergency call mode operation.

13. The vehicle driving controller of claim 1, wherein the processor is configured to *perform algorithms to*:

perform a vehicle control depending on the MRMs.

14. The vehicle driving controller of claim 13, wherein the MRMs comprise at least one of a constant-speed driving control after decelerating at a constant speed, a stop control, or a shoulder stop control.

15. The vehicle driving controller of claim 1, further comprising:

a warning device configured to provide a warning corresponding to the [applied] *provided* different [warning level] *level of warnings*.

16. The vehicle driving controller of claim 15, wherein the warning device is configured to:

provide at least one of a visual warning, an audible warning, or an emergency call mode.

17. A vehicle driving control method, comprising:

determining at least one of a driving situation or a user state during autonomous driving;

[applying a] *providing* different [warning level] *level of warnings to a user,* depending on at least one of the driving situation or the user state, wherein the different [warning level] *level of warnings* is applied depending on an expected time of collision risk or an expected time of deviation of an operational design domain (ODD);

providing a notification of a control authority transition demand to a user depending on the [applied] *provided* different [warning level] *level of warnings*; and determining different minimum risk maneuvers (MRMs) depending on the [applied] *provided* different [warning level] *level of warnings* when a control authority is not handed over to the user after providing the notification of the control authority transition demand.

18. The method of claim 17, wherein the method further comprises:

performing a vehicle control depending on the MRMs.

19. The method of claim 17, wherein the driving situation comprises:

the collision risk within a predetermined amount of time; and the deviation of the ODD that is configured to perform the autonomous driving.

*20. A vehicle driving controller, comprising:*

*a processor configured to perform algorithms to:*

*determine at least one of a driving situation or a user state during autonomous driving;*

*apply a different level of warnings depending on the at least one of the driving situation or the user state during the autonomous driving;*

*provide a notification of a control authority transition demand to a user; and*

*a storage configured to store information regarding the driving situation and the user state, and information regarding the different level of warnings,*

*wherein the processor is configured to perform algorithms to:*

*provide the different level of warnings to a user depending on an expected time of collision risk or an expected time of a deviation of an operational design domain (ODD); and*

*determine different minimum risk maneuvers (MRMs) depending on the applied different level of warnings when a control authority is not handed over to the user after providing the notification of the control authority transition demand to the user depending on the applied different level of warnings.*

* * * * *